Aug. 18, 1936.  W. D. FOSTER  2,051,786
FILM HANDLING APPARATUS
Filed June 12, 1933   8 Sheets-Sheet 1
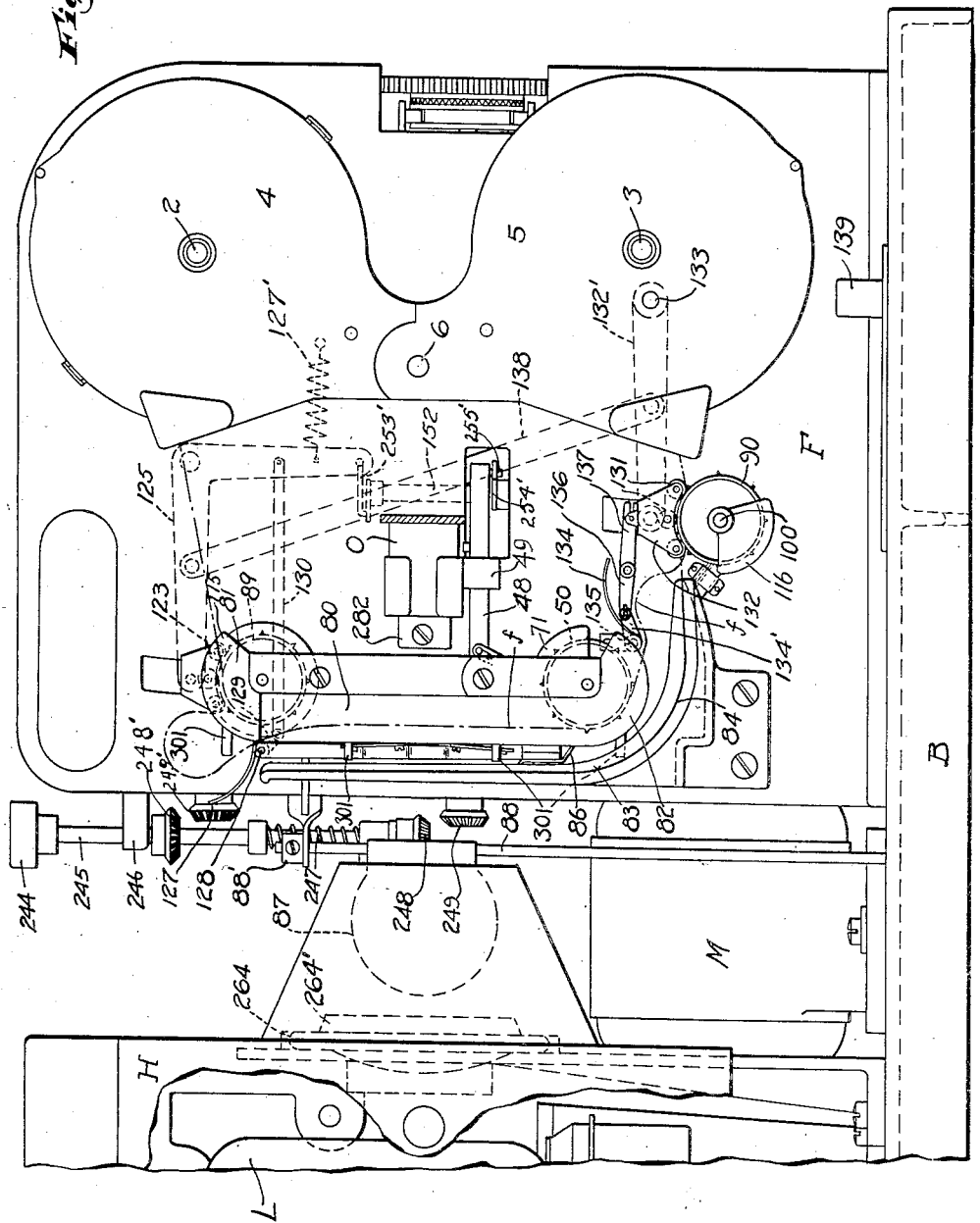
INVENTOR.
Warren D. Foster

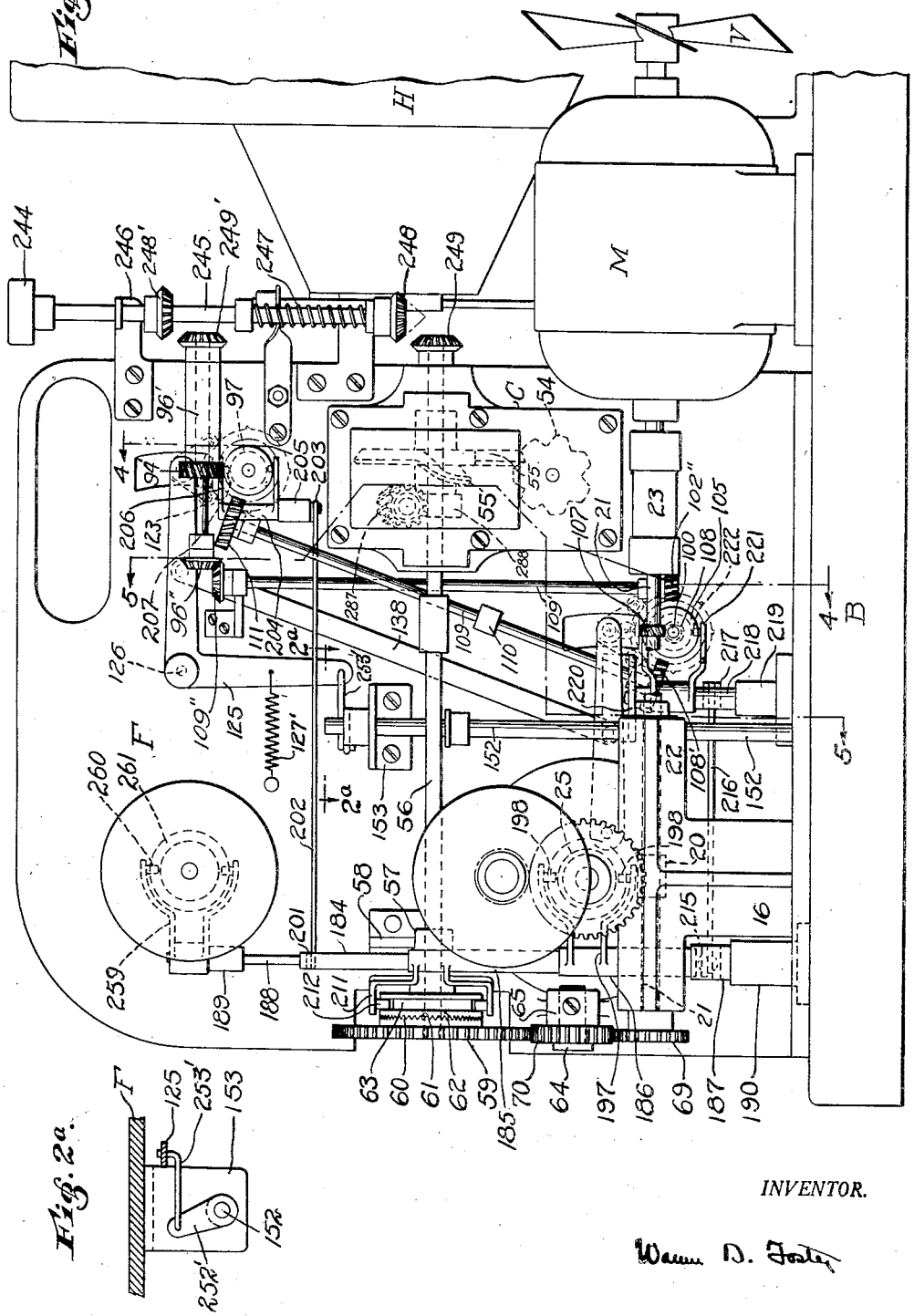

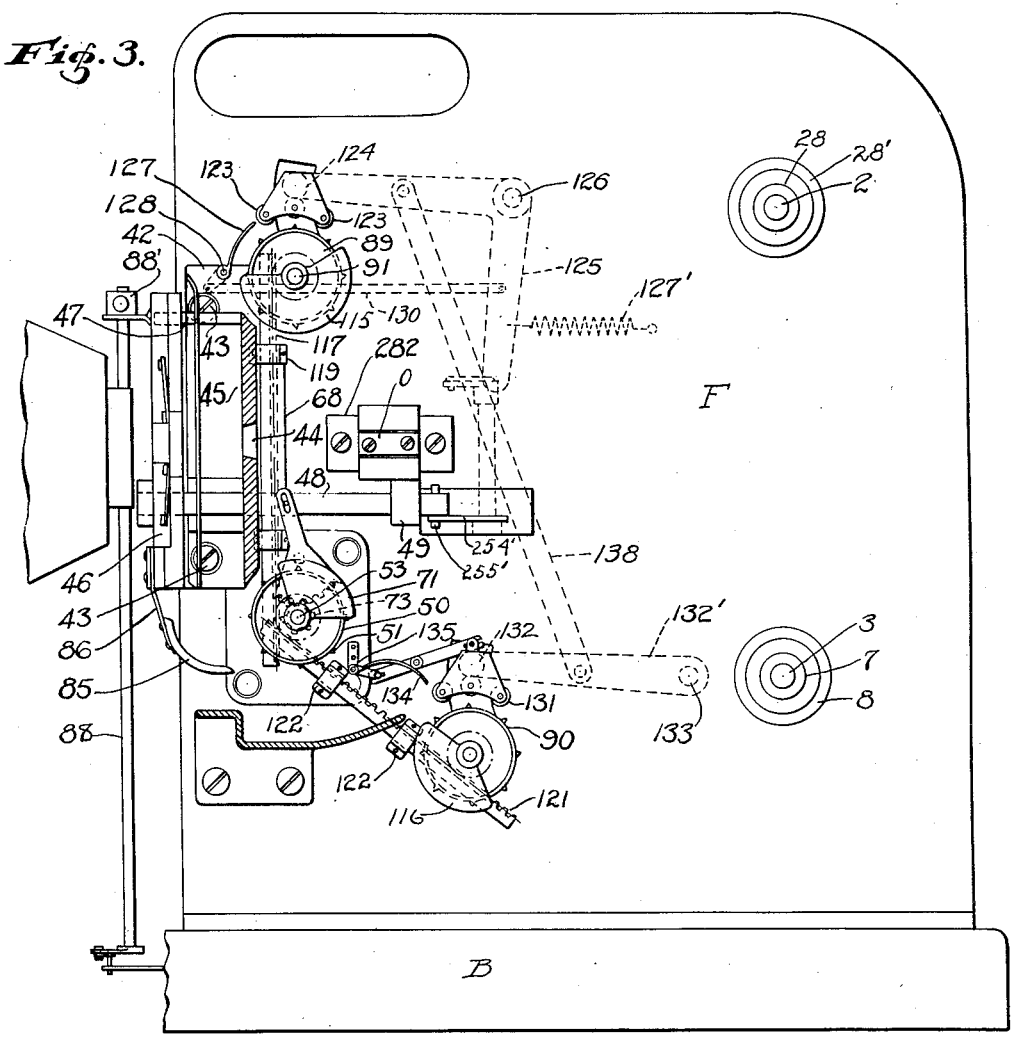

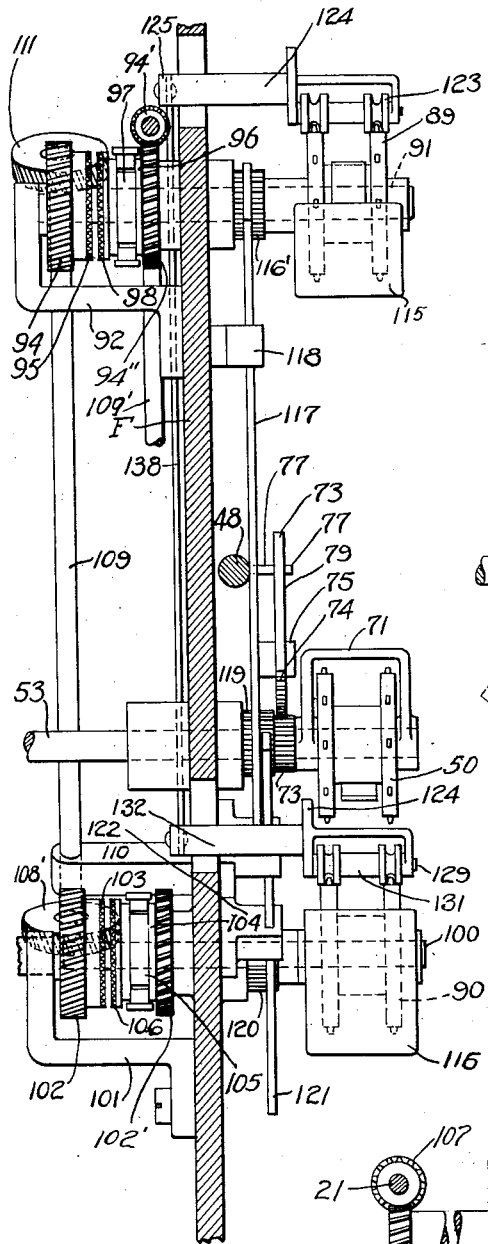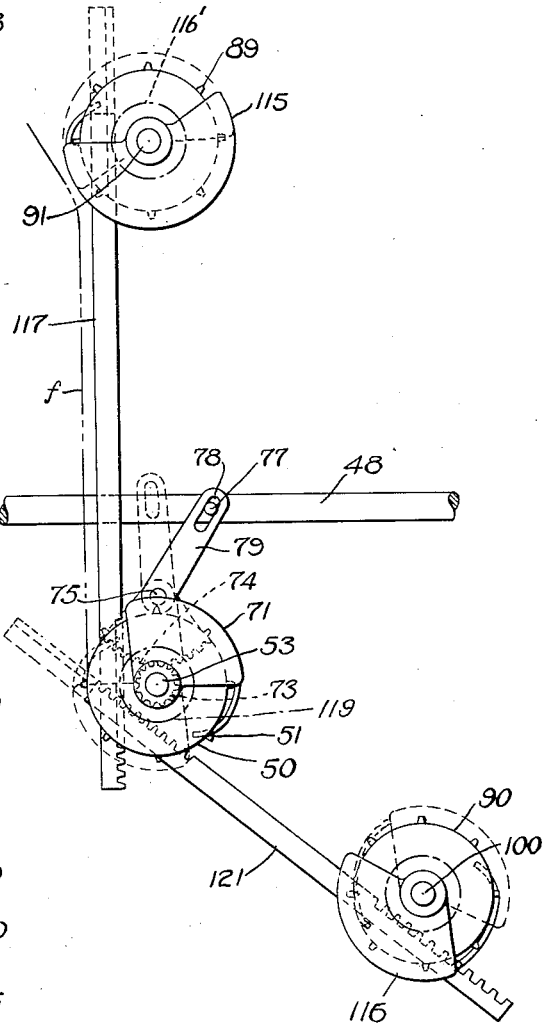

Aug. 18, 1936.    W. D. FOSTER    2,051,786
FILM HANDLING APPARATUS
Filed June 12, 1933    8 Sheets-Sheet 5
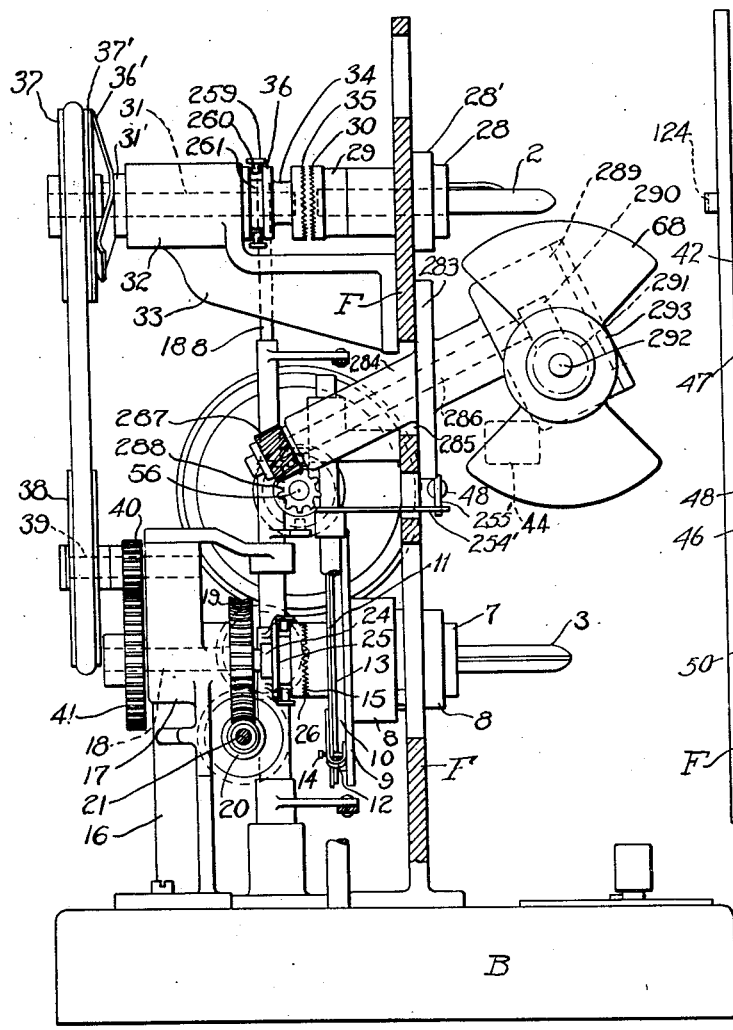
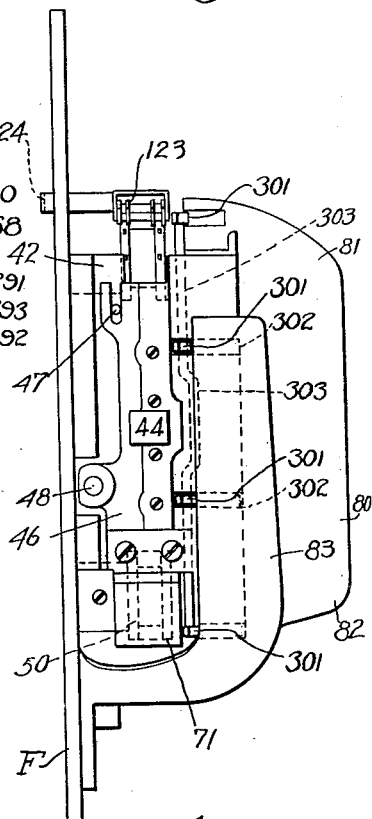
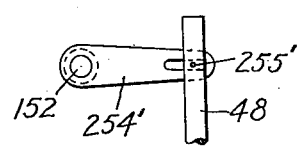
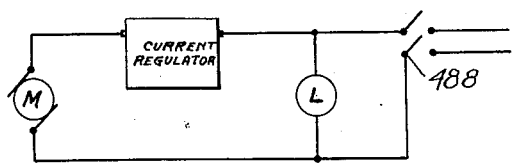
INVENTOR.
Warren D. Foster Aug. 18, 1936.  W. D. FOSTER  2,051,786
FILM HANDLING APPARATUS
Filed June 12, 1933  8 Sheets-Sheet 6
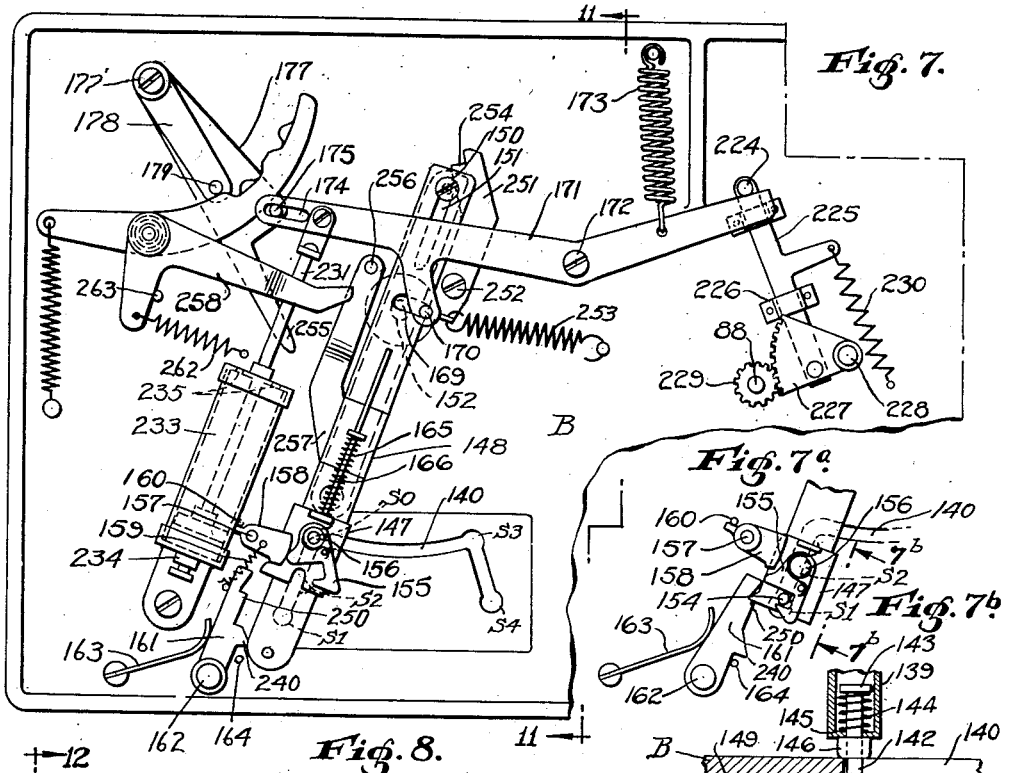
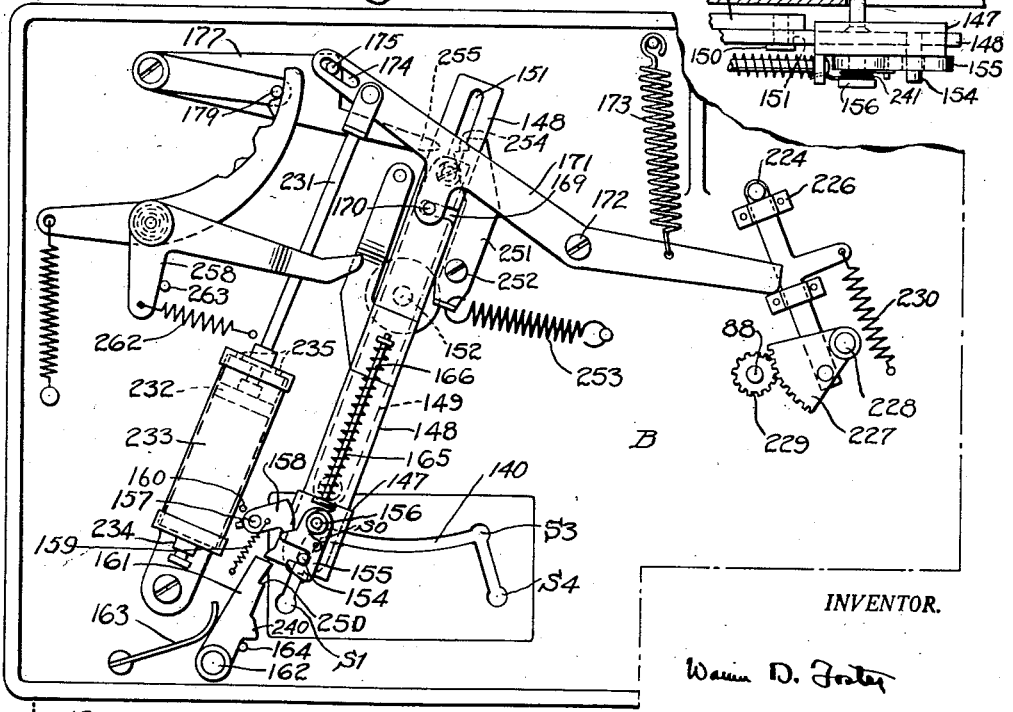
INVENTOR.
Warren D. Foster Aug. 18, 1936.    W. D. FOSTER    2,051,786
FILM HANDLING APPARATUS
Filed June 12, 1933    8 Sheets-Sheet 7

INVENTOR.
Warren D. Foster

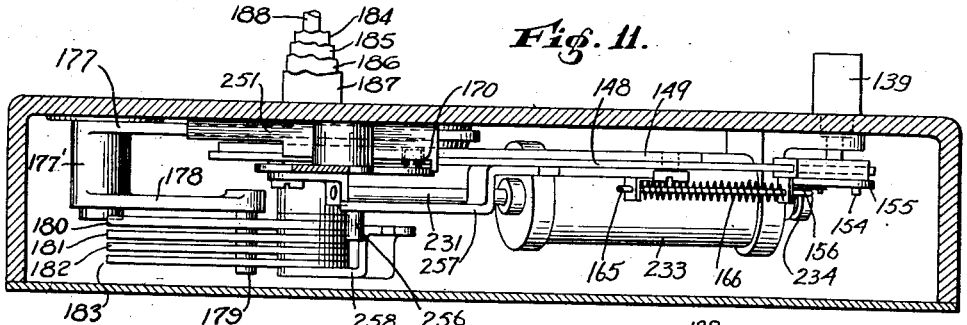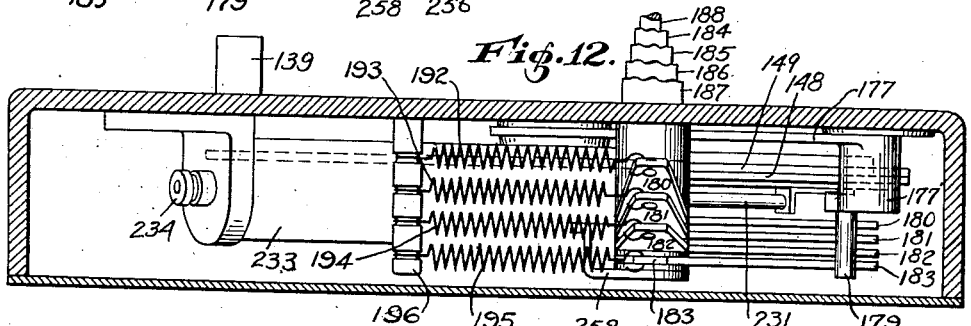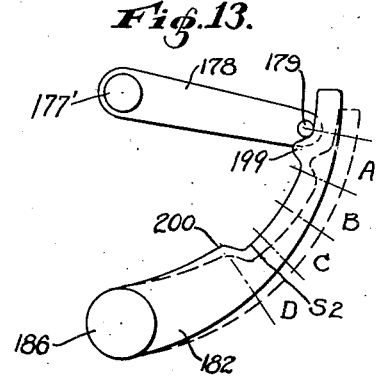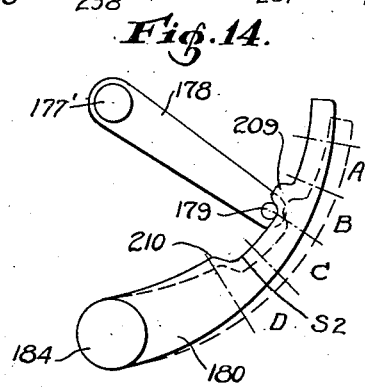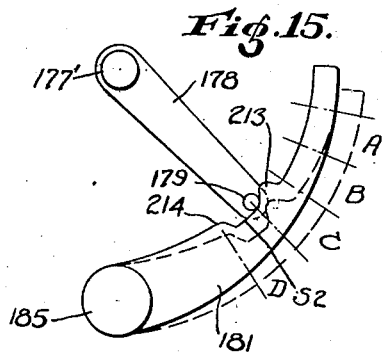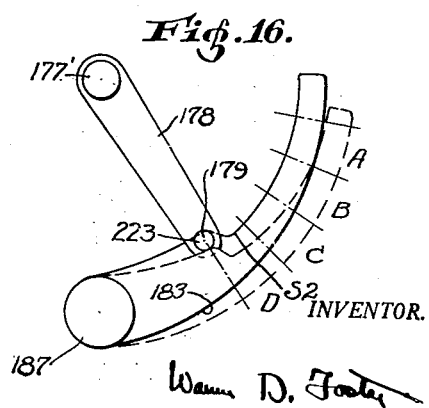

Patented Aug. 18, 1936

2,051,786

UNITED STATES PATENT OFFICE 2,051,786

FILM HANDLING APPARATUS

Warren Dunham Foster, Washington Township, Bergen County, N. J., assignor to Kinatome Patents Corporation, New York, N. Y., a corporation of New York Application June 12, 1933, Serial No. 675,488

85 Claims. (Cl. 88—17)

The present invention relates broadly to the art of photography, and more particularly to improvements in apparatus adapted for the handling of films, whether for the projection or taking of successive pictures or for the reproduction or recordation upon films of images representing sound, as in film playing phonographs, or for the reproduction or recordation of such images in conjunction with visual images. It will readily be understood, however, that the present invention is applicable to many other uses.

The present application is a continuation in part of my copending application, Serial Number 347,959, filed March 18, 1929, which application is a continuation in part of my copending application, Serial Number 57,392, filed September 19, 1925, and allowed April 13, 1933. In such application, Serial Number 347,959, I claim my invention in terms of the mechanism which produces loops of slack film. In the present application, I broadly claim the loop producing mechanism as such in combination with other operable parts of the apparatus. It will be readily understood that the control apparatus claimed herein and many other characteristics thereof may be readily combined with any desired loop setting or loop guiding or slack creating mechanism instead of with that particular loop creating apparatus which for purposes of illustration I show herein and claim in my co-pending parent case.

In my co-pending application, of which this application is a continuation in part, I show and claim loop or slack creating means. In the present application, I am showing the same loop creating means and claiming the combination thereof with the other operable elements of the apparatus. The present application, except for one detail of arrangement of a presser member and a detail of construction and arrangement of a power-applying spring, both as noted hereinafter, is an exact reproduction of said parent case, application Serial Number 347,959.

Included among the objects of the present invention, is the control of mechanism for the production of an unsupported loop of slack film, and the component and associated parts of such mechanism, in timed or sequential relation to the actuation of the other elements of the film handling apparatus.

Also included among the objects of this invention is the provision of improved guiding means for the film, particularly associated with the slack producing means or controlled in advantageous predetermined relation to the control thereof.

Other objects, advantages and characteristics of the present invention are apparent in the following description, the attached drawings, and the subjoined claims. Although I am showing one preferred embodiment of my invention, it will be readily understood that I am not limited to this particular construction as changes can readily be made without departing from the spirit of my invention or the scope of my broader claims.

In the drawings:

Figure 1 is a right side elevation of the machine, certain parts of the lamp housing being broken away and certain parts being omitted for clarity.

Figure 2 is a left side elevation of the machine, certain parts being omitted for clarity.

Figure 2a is a detail view of the control link for the film guides and their associated parts.

Figure 3 is a partial side elevation broken away to show actuating parts in film threading position, certain parts being omitted for clarity.

Figure 3a is a view of a portion of the mechanism for actuating the film positioning and locking fingers, such fingers being in the inoperative position. Figure 3b is a bottom view of the same.

Figure 4 is an enlarged skeleton view, taken on the line 4—4 of Figure 2, looking in the direction of the arrows, showing the clutches for the feeding sprockets, and the stripping shields for the sprockets and the means for operating the same.

Figure 4a is a side enlarged skeleton view of such shields and the means for operating the same.

Figure 4b is a fragmentary side view of the lower part of the structure of Figure 4, looking toward the take-up sprocket shaft.

Figure 5 is a cross section on a line 5—5 of Figure 2 looking in the direction of the arrows.

Figure 6 is an elevational view, broken away in part of the structure of Figure 1, showing the right side only to illustrate the gate.

Figure 6a is a detail view of the gate rod crank lever and associated parts.

Figure 7 is a partial bottom plan view showing actuating levers in "projection-in-motion" position, with the control mechanism at station S1 and with the manual control button at station S0, out of operative contact with the mechanism and about to be moved into such operative contact.

Figure 7a is a detail view of a portion of such control mechanism, with the control button at station S2.

Figure 7b is a view, taken on the line 7b—7b of Figure 7a, looking in the direction of the arrows.

Figure 8 is a partial bottom plan view showing actuating levers in the "intermediate" position S0, with the control button held locked while the mechanical actuating mechanism is in operation.

Figure 11 is an enlarged view, taken upon the line 11—11 of Figure 7, looking in the direction of the arrows, certain parts being omitted for clarity.

Figure 12 is an enlarged view, taken upon the line 12—12 of Figure 8, looking in the direction of the arrows, certain parts being omitted for clarity.

Figure 13 is an enlarged detail view of a portion of the take-up clutch control mechanism.

Figure 14 is an enlarged detail view of a portion of the supply sprocket control mechanism.

Figure 15 is an enlarged detail view of a portion of the intermittent or feeding sprocket control mechanism.

Figure 16 is an enlarged detail view of a portion of the take-up sprocket control mechanism.

Figure 17 (Sheet 5) is a wiring diagram of the apparatus.

Figure 9:
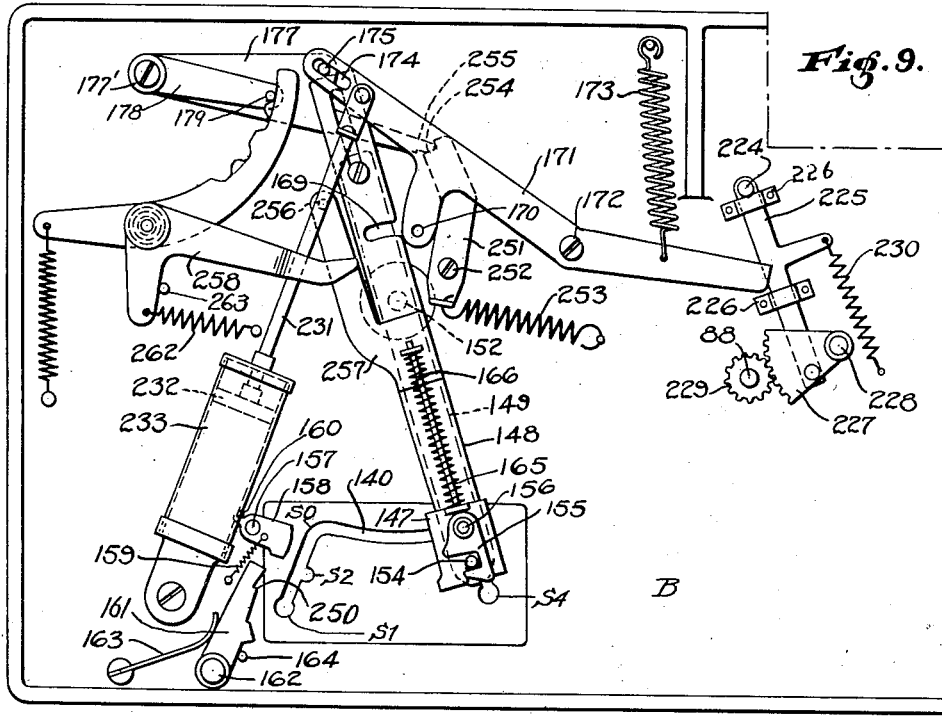
Figure 9 is a partial bottom plan view showing actuating levers in "film threading or changing" position, with the control button at station S3.
Figure 10:
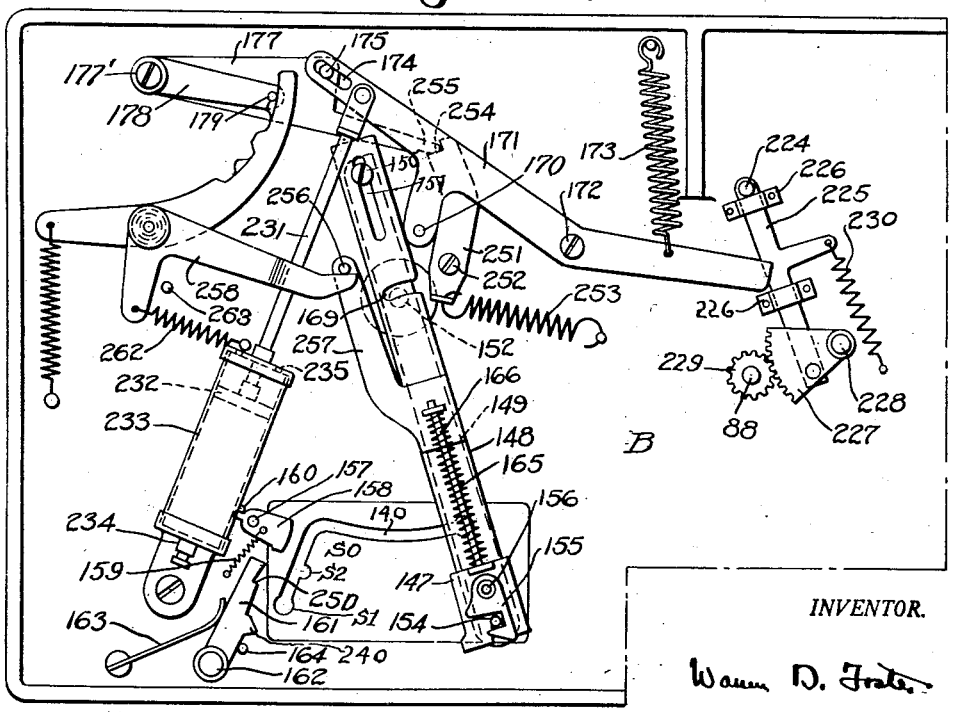
Figure 10 is a partial bottom plan view showing actuating levers in "rewind position", with the control button at station S4.

In carrying out the present invention, there may be provided an apparatus comprising a supporting base B having mounted thereon a lamp L and resistance containing housing H and a supporting frame F upon which are mounted the operating parts of the film feeding and controlling mechanism per se.

Preferably carried by the frame F and projecting from one side thereof in predetermined spaced relationship is a pair of reel supporting spindles 2 and 3, the spindle 2 being adapted for the supporting of a reel of film during the feeding movement thereof and adapted to effect rewinding of the film at the conclusion of the feeding movement, while the take-up spindle 3 is adapted to be frictionally driven during the feeding movement for coiling the film as required.

The film itself may be carried in a combined storage and exhibiting container comprising a pair of containers 4 and 5 having a pivotal connection 6 whereby the containers may be relatively separated to a predetermined extent to expose the desired length of film therebetween, or it may be supported in any appropriate manner.

The spindle 3, which will hereafter be referred to as the driving or take-up spindle, is journaled for rotation in a suitable bearing 7 in an enlarged boss 8 in the frame F. A friction driving member 9 is secured to the left hand end of the spindle as viewed in Figure 5. The driving member 9 has a friction surface 10 with which is adapted to cooperate a second friction member 11 in the form of a disc. The disc 11 and the driving member 9 are preferably held in frictional engagement by means of springs 12 carried by the member 9 and bearing against the disc 11 through the medium of an annulus 13, the springs being held under the desired tension and the annulus being maintained in position by adjusting screws 14. Projecting rearwardly from the disc 11 is a circular series of closely spaced teeth 15 adapted to be engaged by a clutch hereinafter described in detail by means of which the driving spindle 3 may be rotated through the friction surfaces just described.

Projecting from the base B in spaced relation to the frame F is a bearing bracket 16 carrying a bearing 17 for a shaft 18 extending in alignment with the driving spindle 3. Secured in any desired manner to the shaft 18 for rotation therewith is a worm wheel 19 adapted to be driven by a worm 20 secured to a horizontally positioned driving shaft 21 located on one side of the frame F. This shaft at its forward end is mounted in spaced bearings 22 carried by the bracket 16 and is connected to a driving motor M preferably through a flexible coupling 23 of any desired or usual construction. By reason of this mechanism, it will be apparent that when the motor M is operated, the shaft 18 will be positively driven through the worm and wheel before referred to. For transmitting this rotational movement from the shaft 18 to the spindle 3 at will there is provided a collar 24 mounted upon the inner end of the shaft 18 for rotational movement therewith and longitudinal movement relatively thereto and including an extension having therein a groove 25, and terminating in closely spaced teeth 26. By moving such collar 24 to the right, as viewed in Figure 5, the teeth are projected to bring them into engagement with the corresponding teeth 15 whereby a positive drive is immediately established for the driving spindle. This clutch will hereinafter be referred to as the driving spindle or take-up spindle clutch.

The spindle 2, which will hereinafter be designated the rewinding spindle, or, when the context makes such phrasing desirable, as the delivery or supply spindle, is mounted similarly to the driving spindle 3 in a bearing 28 carried by the frame F, an enlarged boss 28' being provided coaxial with such bearing and spindle, and has secured to one end a collar 29 from which project closely spaced teeth 30. Extending in alignment with the rewinding spindle 2 is a shaft 31 suitably journaled in a bearing 32 carried by a bracket 33 illustrated as secured to the frame F. Mounted on the inner end of the shaft 31 for rotation therewith and longitudinal movement relatively thereto is a sleeve 34 having an enlarged end from which project teeth 35 which are adapted to engage with the teeth 30 and constitute a rewinding or supply spindle clutch which may be generally similar in construction and operation to the construction of the driving spindle clutch. Upon movement of the collar 34 to the right as viewed in Figure 5, the teeth 35 will be brought into contact with the teeth 30 whereby the rewinding spindle 2 may be operated for effecting a rewinding of a previously displayed length of film.

For driving the shaft 31 there may be provided a collar 31' pinned to the shaft 31 and bearing against a flat spring 36' which forces a fibre disc 37' against a face of a pulley 37. The pulley 37 is mounted in line with a similar pulley 38 mounted on the outer end of a stub shaft 39 secured in the bracket 16. Also mounted on the shaft 39 is a spur gear 40 adapted to be driven by a similar, but preferably larger, gear 41 on the outer end of the shaft 18. By passing a suitable belt around the pulleys 37 and 38 it will be apparent that the shafts 18 and 31 may be simultaneously rotated by the motor M, the shaft 31 preferably rotating at a higher speed than the shaft 18, and that rotative movement in turn may be imparted by either of these shafts to the respective spindles with which they are in alignment by suitable operation of the controlling clutches.

It will readily be understood by those skilled in the art that this provision of a yielding drive for the shaft 31 especially in combination with the belt and pulley drive, prevents the forward or "leader" end of the film which is attached to the take-up spindle 3 being torn loose therefrom at the conclusion of the rewinding cycle.

Mounted on the frame F adjacent the motor M is a gate section 42 preferably secured in any desired manner as by screws 43 against movement relatively to the frame. This section is preferably formed with an aperture 44 through which light may be projected as well understood in the art, and with a film guiding depression 45 extending lengthwise of the section and intersecting the aperture 44 for the travel of the film, such depression preferably being of great depth relatively to the thickness of the film. Cooperating with the section 42 is a relatively movable section 46 preferably guided by a pin 47 projecting outwardly from the section 42, and secured to one end of the gate opening rod 48 slidable through a suitable opening in the gate section 42 and a suitable bearing 49 on the frame F. By reason of this construction, it will be apparent that when the rod 48 is moved to the left as viewed in Figure 1 it will be effective for moving the section 46 away from the section 42 to permit the removal of the film and the insertion of a new film, while movement in the opposite direction will bring the sections into cooperative relation. An idler may be mounted at the upper end of the section 42 for cooperation with the film below the supply spindle loop, later described.

For effecting the desired intermittent feeding motion of a film in position in the gate, there may be provided a feeding sprocket 50 having film engaging teeth 51 adapted to engage perforations substantially peripherally positioned in the film f.

This sprocket is mounted on a shaft 53 extending transversely through the frame F and carrying at its opposite end a star wheel 54. This star wheel, which may be of any well known construction, is adapted to be intermittently driven by means of a cam 55 secured adjacent one end of a shutter shaft 56 journaled at one end of a grease casing C within which are mounted the cam 55 and the star wheel 54, and at its opposite end journaled in a suitable bearing 57 carried by a bracket 58 projecting from the frame F.

Mounted loosely upon the shaft 56 adjacent the opposite end thereof, (Figure 2) is a gear 59 upon the inner surface of which are mounted the closely spaced teeth 60 which engage with the teeth 61 which project forwardly from the collar 62 mounted in a long bearing upon the shaft 56 for rotational movement therewith and longitudinal movement relative thereto, such collar including the groove 63.

Intermediate the gate section 42 and the objective lens O the shutter 68 may be positioned. This shutter may be mounted as in the casting 283 adapted to be secured directly to one side of the main frame F and over a shaft receiving extension 284 passing through an opening 285 in the frame. Mounted in the extension 284 is a shaft 286 carrying at one end a spiral gear 287 adapted to mesh with a suitable gear 288 on the shaft 56, preferably positioned within the casing C. The opposite end of the shaft 286 extends into an enlargement 289 and is provided with a spiral gear 290 meshing with a suitable gear 291 on a longitudinally extending shaft 292. The shaft 292 at one end carries the shutter 68 which may be secured in position by the driving disc 293. The casting 283 may be shaped to receive the objective lens holder 282, or such holder, as illustrated in Figure 1, may be attached directly to the frame F. It will be understood that the lubrication for the shafts 286 and 292 and the gears 287, 288, 290 and 291 is provided by the solidified oil or other suitable lubricant which fills the box C in which the cam 55 and the star wheel 54 are mounted.

Secured to the end of the driving shaft 21, and in line with the gear 59, is a gear 69 which through the gear 70 mounted upon the shaft 64 supported in the bracket 65 is effective for driving the shutter shaft 56 from the drive shaft. By reason of this construction, it will be apparent that when the collar 62 and the teeth 61 are moved to the left as viewed in Figure 2 the shutter shaft 56 is rotated by the motor M.

As is clearly shown in Figures 4 and 4a, cooperating with the sprocket 50 and normally occupying the position illustrated in Figure 1 of the drawings, is a stripping shield 71 mounted loosely upon the sprocket shaft 53. Secured to the inner side of the shield 71 is a pinion 73 with which meshes an arcuate rack 74 having a pivotal mounting 75 and operated simultaneously with the operation of the gate rod 48 by means of a pin 77 projecting outwardly from the gate opening rod and engaging a slot 78 in the extension 79 of the arcuate rack. With the construction just described, movement of the gate opening rod to the left as viewed in Figure 4a for the purpose of separating the relatively separable gate sections thereby opening the gate, will effect rotation of the rack in a counterclockwise direction as viewed in this figure, thereby rotating the shield in a clockwise direction. This rotational movement of the shield will be effective for engaging the film f and stripping the same from the sprocket preparatory to the removal of the film from the apparatus. During the application of a new film or during rewinding, it will remain in this position, preferably covering all of the teeth of the sprocket which are exposed during the feeding of the film. Thus the threading operation of the film is greatly expedited, and the film completely protected from all teeth during such changing operation or during rewinding.

For further assisting the threading movement, the relatively fixed gate section 42 is provided with a projecting guide 80 having a generally curved contour for gradually guiding the film over the fixed gate section, the guide having a curved and inclined end 81 for insuring passage of the film over the sprocket and an oppositely inclined and curved end 82 for the purpose hereinafter more fully set forth. The frame F also has secured thereto a secondary guide member 83 positioned in spaced relation to the guiding member 80 and adapted to extend substantially in alignment with the inner face of the movable gate section when it has been moved to open position, whereby the film is effectively guided into position between these gate sections. The member 83 has a curved lower extending end 84 having a function corresponding to that of the curved end 82 of the guide member 80, and described in detail hereinafter. Supported from one end of the movable gate section by the spring 86 is a shoe 85 curved to generally conform to the curvature of the sprocket 50, the contour of the inner surface accommodating the teeth 51 of the sprocket. These guides and shoe cooperate in a manner, as will be readily apparent from the drawings, to permit a film to be positioned between the gate members by merely moving the same laterally relative to its normal direction of travel through the gate and to be removed by a similar movement in the opposite direction. It will be readily understood by those skilled in the art that the above construction is also adapted for use under conditions in which the end of the film is initially introduced at one end of the gate and moved therethrough. The movement of the shoe 85, later described, is effective to place the film in operative contact with the sprocket 50. This greatly lessens the time required for threading new film into position, and enables the operation to be performed satisfactorily by an unskilled operator. In this application, I am illustrating my invention by describing mechanism in which the film is initially positioned in the apparatus by edge-wise insertion, but it will be understood by those skilled in the art that many features of it may also be applied to apparatus making use of end-wise threading.

When the apparatus is utilized for so-called "still" projection of pictures and during film threading or rewinding, it is necessary or desirable to provide means in the path of travel of the light rays for protecting the film against danger of injury by reason of undue temperature conditions. For effectively shielding the film during such period, there is provided a trap or shield 87 composed of suitable material such as copper screen of suitable mesh carried by a shaft 88 having one end journaled in a bearing 88' projecting from the frame F and having its other end suitably journaled in the supporting base B. This shaft is adapted to be periodically operated in accordance with the character of operation of the machine.

In order bodily to position the film in proper lateral relation to the film moving means and to the gate, there may be provided a positioning mechanism of the type disclosed and claimed in the copending application, Serial Number 187,980, filed April 30, 1927, of Barton Allen Proctor, now Patent Number 1,944,033, dated January 16, 1934, and in his copending application, Serial Number 348,633, filed March 20, 1929, now Patent Number 1,944,037, dated January 16, 1934, which is a continuation in part of said application and in part of his copending application, Serial Number 54,910, filed September 8, 1925, now Patent Number 1,894,963.

As will be apparent from Figures 1, 6, 3a and 3b, there are provided film positioning fingers 301 of such nature that when retracted they lie entirely within the recess 302, within the area of the fixed gate section. Suitably attached to such fingers, is the connecting rod 303 to which movement is applied through the arm 304, in an opening 305 of which there is inserted the link 306 which in turn is attached to the lever 307 having a pivotal mounting 308 carried by the bracket 309 projecting from the gate section 42. The end of the lever 307 opposite to that to which the link 306 is attached is turned substantially at right angles to the body portion to provide an annular portion 310 which is substantially arcuate and adapted to receive a relatively long slot 311 in which the pin 77 moves. The link 306 is preferably continued beyond the plane of the lever 307 to provide a post 312 for cooperation with the tension spring 313 so positioned as to snap the lever 307 in one direction or the other, after it has been moved a predetermined distance in such direction, the elongated slot 311 constituting a lost motion connection between the parts.

By reason of this construction, it will be apparent that when the rod 48 is moved to the left as viewed in the drawings, it will be effective for rotating the lever 307 in a counterclockwise direction and effecting thereby similar rotational movements of the fingers 301 from the locking position shown in Figure 1 to the inoperative position shown in Figures 3a and 3b. As such fingers 301 are moved into a position substantially normal to the longitudinal axis of the rod 303 and within the limits of the gate section 42, the gate section 46 is moved relatively to the section 42 thus opening the gate and permitting the removal of a previously displayed film and the insertion of another. Movement of the rod to the right, however, will perform the opposite function. The fingers 301 will be rotated to the left, as viewed in Figure 3a, immediately with the beginning of the closing movement of the gate, and will at once sweep completely into the gate and into the film path generally and into proper lateral position relative to the feeding sprockets any film which may have been positioned within the general area of the gate or near to the sprockets. Such bodily positioning will take place well in advance of the completion of the closing movement of the gate and of the completion of the movement of the shoes and guides relatively to the sprockets, thus insuring the proper positioning of the film and precluding the possibility of an edge of the film being caught by the side of the gate or the perforations in the film being other than in proper lateral alignment with the teeth of the sprockets.

As previously stated, I am showing my invention as applied to a loop setting or slack creating apparatus of the type disclosed herein and disclosed and claimed in my parent application, Serial Number 347,959, filed March 18, 1929. It will be readily understood, however, that my invention may be applied to any other suitable loop forming or loop guiding or slack producing apparatus. It will also be understood that such apparatus per se forms no part of the invention which I am claiming herein, and is shown herein merely for purposes of illustration.

Conveniently positioned above and below the gate, I place the conventional continuous sprockets 89 and 90, the former hereafter called the supply or delivery sprocket, to draw film from the supply or delivery reel, and the latter, hereafter called the take-up sprocket, to take film away from the intermittent or feeding sprocket 50 and move it toward the take-up reel.

The supply sprocket 89 I preferably position within the curved upward portion of the guide member 80 so that as the film is placed in the apparatus by a movement lateral to its ordinary course of travel therethrough, it will be placed in operative position relative to such sprocket. As is clearly shown in Figure 4, I mount such sprocket 89 upon the shaft 91, which is supported by the main frame and by the bracket 92. Loosely mounted upon the shaft 91, I place the spiral gear 94 to the right side of which is attached the serrated disc 95. Further to the right, I mount upon the shaft 91 for longitudinal movement relative thereto and rotational movement therewith the clutch collar 96 with the annular depression 97 for cooperation with the clutch fingers later described and terminating to the left in the serrated disc 98 for appropriate engagement with the serrated disc 95.

For actuating the take-up sprocket 90, similar mechanism may be provided. As is likewise clearly shown in Figure 4, I mount such sprocket 90 upon the shaft 100 which is supported by the main frame and by the bracket 101. Loosely mounted upon the shaft 100, I place the spiral gear 102 to the right side of which is attached the serrated disc 103. Further to the right, I mount upon the shaft 100 for longitudinal movement relative thereto and rotational movement therewith the clutch collar 104 with the annular depression 105 for cooperation with the clutch fingers later described and terminated to the left in the serrated disc 106 for appropriate engagement with the serrated disc 103.

The power train for the gears 94 and 102 may be as follows: To the extremity of shaft 100 (Figure 2), there is pinned the gear 108 meshing with the gear 107 pinned to the main power shaft 21 and thus continuously rotating the spiral gear 102 and the gear 108' which engages therewith, such gear 108' being pinned to the shaft 109 which is mounted in the brackets 110 upon the main frame F. To the opposite end of such shaft, there is pinned the gear 111 which drives the gear 94.

Suitable housings, not shown, may be supplied for all gears if desired, and the entire rear portion of the apparatus may be covered by a casing, not shown. If desired, the entire apparatus may be mounted in a cabinet.

Cooperating with the continuously driven sprockets 89 and 90, there are provided stripping and protective shields 115 and 116 similar in operation to the shield 71 which cooperates with the feeding sprocket 50.

The shield 115 is mounted upon the shaft 91, and has pinned to its inner or left hand extension, as viewed in Figure 4, a pinion 116' which meshes with a toothed bar 117 supported as in the bearing 118 and at its opposite end engaging with the pinion 119 which is mounted for movement with the pinion 73.

Similarly, the shield 116 is mounted upon the shaft 100 and has pinned to its inner extension, viewed as above, the pinion 120 which meshes with a toothed bar 121, supported as in the bearing 122, and at its opposite end engaging with the pinion 119 which is mounted for movement with the pinion 73.

Each shield terminates in an inwardly curved extension, narrower than the axial distance between the teeth of the sprocket, thus, as is common in the motion picture art, stripping the film from the sprocket during the feeding operation and hence preventing it from following the teeth too far. It will be recognized that such stripping is entirely different from the primary function of such shields—to wit, the bodily removal of the film from the feeding members and its complete protection therefrom.

The operation of such shields will be obvious from Figure 4a. As the rod 48 is moved, in the manner previously described it will be effective for operating the shield 71, and, with it, the shields 115 and 116. Thus the movement of the rod 48 to the left as viewed in Figure 4a will be effective to move all shields from the full line positions to those shown in dotted line, in timed relation to the opening of the gate, thus removing the film from the teeth of the sprockets and completely shielding it therefrom.

Film guides cooperating with the gate and with the feeding mechanisms are provided.

A guiding element, preferably consisting of three rollers 123, relieved as is common in the motion picture art, is mounted upon the right of the arm 124, as viewed in Figure 4, which extends through an appropriate opening in the main frame F, from the right angled plate 125, pivoted as upon the stud 126 extending from the back of the frame, such guiding element being held in cooperative relation with the supply sprocket 89 by the tension of the spring 127'. A second guiding element, preferably consisting of a curved plate 127, (Figure 1), is pivotally mounted upon the pin 128, extending from the main frame adjacent the upper portion of the gate, and attached to an arm 129 which is connected to the lower portion of the plate 125 by the link 130.

A similar guiding element, preferably consisting of three rollers 131, relieved as is common in the motion picture art, is mounted upon the arm 132, which extends through an appropriate opening in the main frame F, from the plate 132', which plate is pivoted upon the stud 133 extending from the back of the frame. A second guiding element, preferably consisting of a curved plate 134, is pivotally mounted upon the pin 135, extending from the main frame adjacent the lower portion of the gate. Attached to an arm 134' fastened to such plate 134 is the arm 136 which by means of a pin extending therefrom into an elongated slot of the pivoted lever 137 is operated by such lever. The lever 137 is attached to the arm 132, likewise by means of a pin operating in an elongated slot.

As will be noted from a comparison of Figure 1, for example, of this application and Figure 1 of the parent application, Serial Number, 347,959, in this application I show the presser and guiding member 131 mounted above the sprocket 90, while in my said parent case I show this member mounted below this sprocket. This difference of arrangement is a matter of convenience, the operation and control of this element and those related thereto being the same in both disclosures.

To actuate the guiding element positioned adjacent the lower portion of the gate in timed relation with the guiding elements positioned adjacent the upper portion of the gate, the plates 125 and 132' are joined by the link 138.

By reason of such construction, it will be evident that when the plates 125 and 132' are moved upwardly, as viewed in Figure 2, by means later described, the guiding rollers 123 and 131 will likewise be moved upwardly away from the sprocket 89 and 90 and the guiding plates 127 and 134 will be moved downwardly, thus completing the track or path for the film from the supply sprocket through the gate to the take-up sprocket, such movements of such guiding elements being effective to facilitate the positioning or threading of a new film, or the edge-wise removal of one already displayed. Similarly, the downward movement of the plates 125 and 132' will be effective to bring the guiding elements 123 and 131 in cooperative relation with the sprockets 89 and and 90 respectively, thus positioning the film thereupon and retaining it in cooperation therewith and to move the guiding plates 127 and 134 upwardly and away from the film track, thus permitting the unimpeded production of the loops of slack film, in the manner later described.

In an apparatus in which it is desired to position the film by a lateral movement thereof relative to its normal path of travel therethrough, the guiding elements 127 and 134 may include a flange or outer section curved in a direction away from such path of travel. In an apparatus in which it is desired to position the film by the end-wise travel thereof through such path of travel, such guiding elements may be either straight-sided or may include a flange or outer section curved in a direction toward the film. Either of such constructions, under the circumstances stated, will assist in the initial positioning of the film.

For controlling the operation of the apparatus in the manner desired, there is preferably provided a single control member in the form of a knob or button 139 projecting through a substantially U shaped slot 140 in the supporting base B. This slot is so shaped as to provide five operating stations designated respectively S1, S2, S0, S3 and S4. The button 139 is adapted to be moved at will so that the control mechanism will occupy any one of these stations. With the control at the station S1, the respective parts of the apparatus are in such position as to insure the normal projection of pictures as usual motion pictures. With the control button at station S2, there is obtained a so called still or stereopticon projection, the movement of the button from the station S1 to the station S2 being effective for disengaging the respective driving mechanisms which are in operation during the projection of pictures in motion. With the control button at the intermediate position, station S0, mechanical timing of the actuation of the control mechanism becomes automatically operative. With the button in position at station S3, the respective parts of the apparatus are in such position as to permit the positioning of a film therein or the removal of a film which has just been fed therethrough. It will be understood that the movement of the button from station S0 to station S3 automatically produces the required change in the operating position of the parts. With the button in position at station S4, the respective parts of the apparatus are in such position as to permit rewinding of the film by means of the motor M. The movement of the button from station S3 to station S4 automatically produces the required change in operating conditions necessary for such rewinding.

The control mechanism actuated by the control button 139 is to a large extent shown in Figures 7, 7a, 7b, 8, 9, and 10, which illustrate the change in the position of the parts following the movement of the control button to the respective stations. The control button 139 is attached to the control mechanism in such manner that the connection therebetween is automatically destroyed or reestablished in accordance with the operating requirements of the apparatus. Such button may be mounted upon the pin 142 having a head 143 against one side of which bears one end of a compression spring 144 (Figure 7b). The opposite end of such spring bears against a flange 145 extending inwardly from the control button 139. By reason of this construction, it will be apparent that the button may be moved vertically on the pin 142 but that the spring 144 will normally be effective for urging the button downwardly. At its lower end, the button 139 has a collar 146 of a diameter substantially to conform to the contour of the slot 140 as enlarged at each of the respective operating stations, whereby with the button in its lower position accidental movement from one of these stations is prevented. The lower end of the pin 142 is attached to the sleeve 147 which is slidably mounted upon the lever 148. Such lever 148 is mounted upon the lever 149. The headed pins 150, attached to the lever 149, extend through slots 151 adjacent each end of the lever 148. The lever 149 is keyed or otherwise secured to one end of a gate control rod 152 journaled in a bearing bracket 153 projecting from the rearward side of the main frame F. Being secured to the gate control rod 152 which is capable only of a turning movement about its longitudinal axis, the lever 149 is restricted in movement to rotation only. The combined sliding and rotating lever 148 is effectively mounted on the rotating lever 149 for rotational movement simultaneously therewith and sliding movement independently thereof. Projecting downwardly from the lever 148 is a pin 154 with which the hook 155 pivoted upon the pin 156 attached to the sleeve 147 is adapted to cooperate.

Pivoted upon the pin 157 substantially in line with the portion of the slot 140 extending from station S3 to station S0 is the block 158, normally urged downwardly by the spring 159, upward movement being limited by the pin 160 with which the left hand projection of the block is adapted to contact. Positioned below such block is the pawl 161 pivoted as upon the pin 162 and urged to the right by the spring 163 against the pin 164. Urging the sleeve 147 downwardly as viewed in Figure 7 or 8, there is provided the spring 165 mounted about the rod 166 which may be supported in any desired manner by such sleeve and by the lever 148.

By reason of the above construction, it will be evident that when the combined rotating and sliding lever structure is rotated to the left as viewed in the above mentioned figures from the position S3 slightly beyond the position S0, the left projecting nose of the hook 155 will engage with the block 158 and will thereby be forced to the right from the position shown in Figure 8 to that shown in Figure 7, thus destroying the relationship between the control button 139 and the actuating lever 148 and permitting the power-operated portion of the control mechanism to complete the actuation of the apparatus wholly independently of the user.

At a point intermediate its length, the combined rotating and sliding lever 148 is furnished with the transversely extending recess 169 adapted to cooperate with the pin 170 projecting from the lever 171, pivoted upon the pin 172, the longer or left hand end of such lever, as viewed in Figure 7 or 8 being urged downwardly by the relatively powerful spring 173. In the slot 174 in one end of such lever 171 is mounted the pin 175 attached to the control plate 177 which by means of the collar 177' is attached for rotation to the control rod 178 in the other end of which rod is inserted the post 179 which operates the feeding control arms 180, 181, 182, and 183. To such arms are attached the coaxial upwardly extending sleeves 184, 185, 186 and 187 respectively, the rotation of which is effective to actuate the various feeding clutches. Such sleeves surround the control rod 188 which operates the rewinding spindle clutch. Such sleeves and rod are journaled for rotation in the base of the machine and in the bearings 189 and 190 extending from the main frame.

As will be clearly seen from Figure 12, the springs 192, 193, 194 and 195, attached suitably to control arms 180, 181, 182, and 183, respectively, and to the post 196, are employed to hold such control arms in contact with the post 179.

Reference to Figures 13, 14, 15, 16 and 2 will make clear the operation of the control arms and sleeves. Such Figures 13 to 16 inclusive are arranged in the order of operation of the respective parts, not of their physical arrangement.

The take-up spindle clutch is controlled by arm 182 and sleeve 186, as shown in Figures 13 and 2.

The forked arm 197 may extend from the sleeve 186 and carry pins 198 which engage the groove 25 of the take-up spindle clutch. The rotation of the rod 178 in a clockwise direction as viewed in Figure 13 will force the post 179 into contact with the protuberance 199 of the arm 182, thus moving such arm to the dotted line position, and similarly rotating the control sleeve 186, and moving the control fingers 198 inwardly as viewed in Figure 2, thus making the take-up spindle clutch operative. Such further movement of the post 179 will cause the arm 182 to move back into the full line position of Figure 13, urged by the spring 194, thus declutching the take-up spindle. As the post 179 is moved over the protuberance 200, it will again move the arm 182 to the right as viewed in Figure 13, thus again actuating the take-up spindle. The effect of the contrary movement of the plate 178 will be obvious.

The supply spindle clutch is controlled by arm 180 and sleeve 184, as shown in Figures 14 and 2.

Extending from the control sleeve 184 is the arm 201 which operates the link 202 which through the arm 203 is effective to rotate the rod 204 supported by the bearing 205. The forked arms 206, supporting in their outer extremities the fingers 207, extend from such rod 204, such fingers being positioned within the groove 97 of the feeding sprocket clutch collar. The rotation of the rod 178 in a clockwise direction as viewed in Figure 14 will force the post 179 into contact with the protuberance 209 of the arm 180, thus moving such arm to the dotted line position, and similarly rotating the control sleeve 184 and moving the control fingers 207 and the supply sprocket clutch collar 96 inwardly, as viewed in Figure 2, thus making such clutch operative. Such further movement of the post 179 will cause the arm 180 to move back into the full line position of Figure 14, urged by the spring 192, thus declutching the supply sprocket. As the post 179 is moved over the protuberance 210, it will again move the arm 184 to the right as viewed in Figure 14, thus again actuating the supply sprocket. The effect of the contrary movement of the plate 178 will be obvious.

The shutter or intermittent feeding clutch is controlled by the arm 181 and sleeve 185 as shown in Figures 15 and 2.

Extending from such sleeve 185 are the forked arms 211 from the ends of which project the clutch pins 212 which coact with the groove 63 of the collar 60. The rotation of the rod 178 in a clockwise direction as shown in Figure 15 will force the post 179 into contact with the protuberance 213 of the arm 181, thus moving such arm to the dotted line position, and similarly rotating the control sleeve 185 and moving the forked arms 211 and the pins 212 to the left as viewed in Figure 2, thus making the shutter clutch operative. Such further movement of the post 179 will cause the arm 181 to move back into the full line position of Figure 15, urged by the spring 193, thus declutching the intermittent shaft. As the post 179 is moved over the protuberance 214, it will again move the arm 181 to the right as viewed in Figure 15, thus again actuating the intermittent sprocket and shutter. The effect of the contrary movement of the rod 178 will be obvious.

The take-up sprocket clutch is controlled by the arm 183 and the sleeve 187, as shown in Figures 16 and 2.

To such sleeve 187, there may be attached the arm 215 from which the link 216 extends to the arm 217 attached to the shaft 218, suitably journaled in the bearing 219 and the bracket 220, and having attached thereto the arms 221 carrying the pins 222 which cooperate with the groove 105 in the driving portion of the take-up sprocket clutch. The rotation of the rod 178 will be without effect upon the control plate 183 until the post 179 engages the protuberance 223, thus forcing it into the dotted line position shown in Figure 16, rotating the sleeve 187 and forcing the pins 222 inwardly as viewed in Figure 2, thus actuating the take-up spindle clutch. As the post 179 is moved in a contrary or upward direction, the control arm 183 will again occupy the full line position, thus rendering the take-up sprocket again inoperative.

Immediately prior to the normal projection of pictures in motion, it is necessary to move the shield or screen 87 from its normal light intercepting or protective position to a position out of the path of light. This is positively accomplished through the engagement of the right hand end of the lever 171, as viewed in Figures 7 to 10 inclusive, with the pin 224 extending from the bar 225 guided by the brackets 226 attached to the base B. The other end of such bar 225 is suitably attached to the arcuate rack 227 pivotally mounted upon the pin 228, the teeth of such rack engaging with the pinion 229 attached to the lower end of the shaft 88 which operates the heat screen. The spring 230 suitably attached to an extension of the bar 225 and the base will be effective normally to hold the heat screen in the closed position. It will be readily understood that the first portion of the movement of the combined pivoted sliding lever from the station S0 to the point opposite station S2 will be without effect upon the heat shield but that the heat shield will be moved to inoperative position during the travel from such point to station S1. Thus the heat shield is kept in cooperative relation with the film until the apparatus has been put into full operation.

In order definitely to time the travel of the control mechanism from station S0 to station S1 and hence to time the operation of the loop or slack creating mechanism, a dash pot is provided. Suitably connected to the lever 171, is the piston rod 231, the piston 232 working in the cylinder 233 which is pivotally attached to the base B. An adjustable port 234 is provided, whereby the escape of the air may be regulated at will. The usual escape openings 235 are provided in the opposite head of the cylinder.

To illustrate the actuation of the device to protect motion pictures, it will be assumed that the user places the film within the gate and moves the control button from station S3 to the intermediate station S0. Such movement, as will be made fully apparent in a following portion of this specification, will have rotated the gate control rod 152 thereby having retracted the stripping shields 71, 115, and 116, actuated the shoe 85 and the guiding rollers 123 and 131 to bring the film into contact with the sprockets 50, 89 and 90, moved the guides 127 and 134 away from the sprockets 89 and 90, actuated the positioning fingers 301, and closed the gate. When the control button reaches station S0, as has previously been described, the mechanical control mechanism will become operative, and necessarily will move the sliding lever 148 from station S0 to station S1, at a uniform and predetermined speed, the actuating spring 173 being governed by the dash pot. Simultaneously therewith the control post 179 will move from the position in which it is shown in Figure 13 to that in which it is shown in Figure 16. During its passage through the zone which is indicated as A in Figures 13 to 16 both inclusive, it will actuate the take-up spindle, which will be effective for pulling the film over the ends of the teeth of the various sprockets and completing the engagement between the perforations in the film and such teeth. No other film moving mechanism will be operative in zone A. In zone B, in the manner previously described, such post 179 will actuate the supply sprocket which will thereupon draw a predetermined amount of film from the supply reel into a loop between such sprocket and the intermittent sprocket. As the post 179 moves through zone C, the intermittent sprocket alone will be actuated, for a period slightly greater than one half that in which the supply sprocket was actuated, and will draw down approximately one half of the loop of film which had been previously created between the intermittent sprocket and the supply sprocket. Thus it will be evident that the two necessary loops of unsupported slack film will have been created, one adjacent the supply sprocket and one adjacent the take-up sprocket. During zone D, the post 179 will simultaneously form contact with the protuberances 200, 210, 214, and 223 thus placing all of the film feeding mechanisms in simultaneous operation. Within zone D, the heat protective means will be withdrawn from shielding position.

Prior to the movement of the lever 148 downwardly from station S0, the sleeve 147 and the manual control button carried thereby, as has been previously described, are held by the engagement of the bottom of the sleeve 147 with the top of the pawl 161. As the lever 148 completes its downward movement to station S1, the pawl 161 will be forced to the left by engagement between the extension 240 thereupon and the side of the lever 148. At this point, such parts will be in the position shown in Figure 7. Thereupon the spring 165 will move the control sleeve 147 and the control button 139 downwardly. The hook 155 will pass first to the left of the pin 154 and thereafter, urged by the spring 241, will move to the right and engage therewith thus reestablishing the connection between the manually operable control button 139 and the control mechanism.

In the purpose of further illustration, it will be assumed that the user wishes to examine one picture at leisure. He will manually move the control button back toward station S0 and then slightly toward the right into the station S2, as is shown in Figure 7a. At such point, the post 179 will be upon the line S2 in Figures 13 to 16 inclusive, all clutches then being inoperative and the heat shield being in light intercepting position.

If, after having examined one picture projected motionless, the user wishes to show additional still pictures, he may move the knob 244 downwardly, thus depressing the rod 245 held by the bracket 246 against the compression of the spring 247 thus placing the gears 248 and 248' in cooperation with the gear 249 attached to the rearward end of the rod 56 and the gear 249' attached to the rearward end of the auxiliary feeding shaft 96', suitably supported by the main frame F, to which is attached the spiral gear 94' which engages with the spiral gear 94'' attached to the shaft 91. A bevel gear 96'' is fastened on the rear end of the shaft 96' for engaging a bevel gear 109'' fast on the upper end of a downwardly extending shaft 109' which has fastened to its lower end a spiral gear 102'' for driving a spiral gear 102' fastened on the shaft 100 of the take-up sprocket. Thus he is able to rotate all feeding sprockets and the shutter. In returning to the operation of pictures in motion, it is impossible for him to move the control button from station S2 to station S1 without proceeding to the intermediate position station S0 and thereupon actuating the control mechanism whereby the loops will be mechanically re-formed since the shoulder 250 of the pawl 161 will be locked in engagement with the sleeve 141.

It may be assumed that after the projection of a single image from the film or the repetitious projection thereof, it is desired to change the film, or that in starting operation it may be necessary to move the parts of the apparatus into such position that a film may be threaded therein. Under such circumstances the control button will be manually moved from station S2 or station S1 through station S0 to station S3. Such movement from station S0 will be effective for again placing the spring 173 under tension and resetting the dash pot. Such movement also will be effective for moving the combined swinging and sliding lever structure against the shouldered side of the detent 251, which is pivoted on the stud 252 under the influence of the spring 253 so that its projecting shoulder 254 will engage with the tooth 255 of the lever 177 before the pin and the slot have been removed from cooperative relation, thus holding locked in inoperative position all the clutch control means, dash pot and spring and consequently the loop or slack creating mechanism. As the control button 139 is further rotated to the right as viewed in Figure 9, the pin 170 and the recess 169 will be completely removed from cooperative relation and the gate control rod 152 will be rotated in a counterclockwise direction.

Such rotation of the gate control rod is effective for opening the gate, for moving the guides 123, 127, 131 and 134 and their associated parts to film threading position, and for so actuating the stripping shields 71, 115 and 116 as to effect the desired bodily removal of the film from the sprockets 50, 89 and 90 and the shielding of such sprockets so as to facilitate the threading of a new film into position or to permit the rewinding of a film. Such movement is also effective to move the positioning fingers 301 to inoperative position.

Adjacent its upper portion there is secured to the gate control rod 152 an arm 252' to which is attached a link 253' attached to the plate 125 previously described (Figure 2a). Movement of the control button from station S0 to station S3 will be effective for rotating the gate control rod in a counter-clockwise direction as viewed in Figure 9 and moving the link 253' to the right as viewed in Figure 2 thus moving the film guides to film threading position. When in such position the guiding elements 123 and 131 will be in relatively distant relation to the sprockets 89 and 90 respectively, and the guides 127 and 134 in relatively close relation to such sprockets.

Such rotation of the gate control rod 152 in a counter-clockwise direction as viewed in Figure 9 will also be effective to move the arm 254' attached thereto to the left as viewed in Figure 1, thus through the medium of the pin 255' attached to the gate control rod 48 moving such rod to the left as so viewed, thus separating the gate sections, moving the positioning fingers to inoperative position, and actuating the stripping shields (Figure 6a).

If it is not desired to change a film, the control button may be moved from station S3 to station S4, or may be moved from station S1 or S2 to station S4 without stopping at an intermediate station. This movement will be effective for bringing the pin 256 attached to the plate 257 attached to the sliding and rotating lever 148 into engagement with the lever 258 and moving it from the position shown in Figure 9 to that shown in Figure 10, thus rotating the rewinding spindle control rod 188. At its free end, this control rod carries spaced arms 259, provided with fingers 260, normally lying in the groove 261 of the rewinding clutch collar 36. The rotation of the control rod 188 as occasioned by the movement of the control button from station S3 to station S4 will be such as to move the rewinding clutch into operative position, whereby the spindle 2 is connected in driven engagement with the shaft 31, this engagement being such that the film may be rewound by the continued operation of the motor M. It will be readily understood that any undue strain upon the film during or at the conclusion of the rewinding cycle is obviated not only by the slippage between the driving pulley 37 and the collar 31', but also by slippage between the belt and its pulleys 37 and 38 previously described.

From the foregoing, it will be apparent that the operation of a single control button performs in succession the necessary changes in the operating positions of the various parts for permitting any desired condition of operation of the apparatus. Upon movement of the control button from station S4 to station S3, the rewinding clutch will be disengaged and the lever 258 moved into inoperative position against the pin 263 by the action of the spring 262.

During the movement of the control button 139 from station S3 to station S0, the combined swinging and sliding lever structure will come into engagement with the detent 251 and swing it in clockwise direction against the action of its controlling spring 253, to thereby release the tooth 255 of the lever 177 from the holding action of the detent, and permit the lever 177 and its associated parts to be subsequently operated by the spring 173 whereby the necessary loops will be formed and the apparatus placed in full operation.

It will be readily understood that, if desired, the motive means provided for the control mechanism may, instead of the spring device described herein, be the electrical means described in my copending parent application Serial Number 347,959. The actuation of the control mechanism for the purpose of rewinding the film or of controlling the gate and its associated parts or otherwise may be accomplished in accordance with the automatic means set forth in my said application Serial Number 57,392, filed September 19, 1925, now Patent Number 1,943,303, dated January 16, 1934. In this application, I have shown and described a control mechanism, with motive means therefor in the form of a spring 173. This control mechanism and motive means is a modification and improvement of the corresponding motive means and control mechanism as shown in Figures 18 and 19 of my said parent application Serial Number 347,959. Other than as stated in this paragraph and previously in connection with presser and guide member 131, these disclosures are identic.

Carried by the frame F and positioned in line between the filament of the light source L and the aperture 44 of the gate is a condensing lens 264' carried by the lens casing 264. This condensing lens as is usual in the art concentrates the light upon the aperture. Forward of the gate the objective lens O may be positioned as previously described, for example, within the holder 282.

The combined lighting resistance and ventilating unit may be contained within the housing H. Within this housing may be mounted in any desired manner a lamp L and a reflector, not shown. If desired, a variable resistance or rheostat may be provided for the motor circuit, in order to operate the apparatus at varying speeds.

A fan V may be attached to the rearward end of the armature shaft of the motor. It will be understood that such fan will be in operation concurrently with the operation of the light source.

Preferably the motor is of a constant speed type or any desired form of voltage regulator may be placed in circuit with the motor, to prevent current fluctuations and consequent variations in speed.

Many of the advantages of the present invention have been set forth in the preceding portion of the specification. Other advantages include the provision of unitary mechanism whereby all of the operations of a film handling apparatus including the creation of loops of slack film may be controlled in the manner desired. Included among the advantages is the provision of means for the actuation of the mechanism for the production of loops or slack in the film in timed or sequential relation to the actuation of all other operations of the film handling apparatus whereby the apparatus may be placed in complete operation with the requirement of minimum skill or time on the part of the user and minimum likelihood of injury to the film. Further advantages arise from the provision of unitary or interlocked control means for the loop producing mechanism and the other elements of the apparatus, such elements including, for example, those which guide or position the film, or retain it in place, or remove it from the feeding means, or protect it therefrom, the gate, film feeding means, take-up, and rewinding mechanism. Still further advantages arise from the use of the normally continuously operable sprockets which are adapted to move the film for the regular or normal feeding thereof as that portion of the loop creating mechanism which engages the film for the purpose of the initial production of slack therein.

Other advantages include the locking of the loop producing mechanism so that it is ineffective upon the film under certain conditions, as, for example, when its operation might injure the film.

Additional advantages arise from the use of control mechanism which is mechanically operated and definitely timed and from the use of separate motive means for initiating the operation of the apparatus and for operating the apparatus thereafter.

Still further advantages arise from the provi-

I claim:

1. In a film handling apparatus, two continuously moving film supports, means for intermittently feeding a film from one of said supports toward the other thereof, said means including a toothed member positioned between said supports and adapted to engage the film, means for separating the film and said toothed member whereby said toothed member and the film are maintained free of engagement, operable threading means for initially moving the film for producing an unsupported loop of slack film between said intermittent toothed member and each of said continuous supports, means for rendering said slack producing means effective to move the film to produce an unsupported loop of slack therein, and control means interconnecting said means for separating the film and said intermittent feeding member and said means for rendering said slack producing means effective upon the film and including devices for operating each of the same.

2. In a film handling apparatus, two continuously moving film supports, means for intermittently feeding a film from one of said supports toward the other thereof, said means including a toothed member positioned between said supports and adapted to engage the film, means for separating the film and said toothed member whereby said toothed member and the film are maintained free of engagement, threading means engaging the film and operable for initially moving film from one of said supports toward the other support for producing slack in the film between said intermittent toothed member and each of said continuous supports, means for rendering said slack producing means effective upon the film, and control means interconnecting said means for separating the film and said intermittent feeding member and said means for rendering said slack producing means effective upon the film and including devices for operating each of the same.

3. In a film handling apparatus, a continuously driven delivery member, a continuously driven take-up member, a gate structure disposed therebetween, said gate structure comprising complementary members defining therebetween a path for a film, means for intermittently feeding the film from said delivery member through said path toward said take-up member, said feeding means extending within said path between said gate members for feeding the film therealong, threading means for moving the film for initially producing an unsupported loop of slack film between said continuous members whereby an unsupported loop of slack is provided in the film to allow for the compensation necessary because of the difference in the character of movement of said continuous members and said intermittent feeding means during the operation of the same, means for operating said threading means, operable means for preventing said feeding means from operatively engaging the film, and control means interconnecting said operating means and said means for preventing said feeding means from operatively engaging the film and effective for operating both of the same.

4. In a film handling apparatus, a continuously driven delivery member, a continuously driven take-up member, a gate structure disposed therebetween, said gate structure comprising complementary members defining therebetween a path for a film, means for intermittently feeding the film from said delivery member through said path toward said take-up member, said feeding means extending within said path between said gate members for feeding the film therealong, threading means for initially and selectively driving the first of said continuous members and said intermittent feeding means for producing unsupported loops of slack film between said continuous members and said intermittent feeding means whereby compensation is provided in the film to allow for the difference in the character of movement of said continuous members and said intermittent feeding means during the operation of the same, operable means for preventing said feeding means from operatively engaging the film, and control means interconnecting said threading or slack producing means and said means for preventing said feeding means from operatively engaging the film and effective for operating both of the same.

5. In a film handling apparatus, a continuously driven delivery member, a continuously driven take-up member, a gate structure disposed therebetween, said gate structure comprising complementary members defining therebetween a path for a film, means for intermittently feeding the film from said delivery member through said path toward said take up member, said feeding means extending within said path between said gate members for feeding the film therealong, threading means for moving the film for initially producing an unsupported loop of slack film between said continuous members whereby an unsupported loop of slack is provided in the film to allow for the compensation necessary because of the difference in the character of movement of said continuous members and said intermittent feeding means during the operation of the same, means for operating said threading means, operable means for preventing said feeding means from operatively engaging the film, and sequential control means operatively interconnecting said operating means and said means for preventing said feeding means from operatively engaging the film and including devices for operating said slack producing means and said means for preventing said feeding means from operatively engaging the film in successive relation one to the other.

6. In a film handling apparatus, a continuously driven delivery member, a continuously driven take-up member, a gate structure disposed therebetween, said gate structure comprising complementary members defining therebetween a path for a film, means for intermittently feeding the film from said delivery member through said path toward said take up member, said feeding means extending within said path between said gate members for feeding the film therealong, threading means for initially and selectively driving the first of said continuous members and said intermittent feeding means for producing unsupported loops of slack film between said continuous members and said intermittent feeding means respectively whereby compensation is provided for difference in the character of movement of said continuous members and said intermittent feeding means during the operation of the same, operable means for preventing said feeding means from operatively engaging the film, and sequential control means operatively interconnecting said threading or slack producing means and said means for preventing said feeding means from operatively engaging the film and including devices for operating said slack producing means and said means for preventing said feeding means from operatively engaging the film in successive relation one to the other.

7. In a film handling apparatus, a continuously driven delivery member, a continuously driven take-up member, a gate structure disposed therebetween, said gate structure comprising complementary members defining therebetween a path for a film, means for intermittently feeding the film from said delivery member through said path toward said take-up member, said feeding means extending within said path between said gate members for feeding the film therealong, threading means for moving the film for initially producing an unsupported loop of slack film between said continuous members whereby an unsupported loop of slack is provided in the film to allow for the compensation necessary because of the difference in the character of movement of said continuous members and said intermittent feeding means during the operation of the same, means for operating said threading means, operable means for preventing said feeding means from operatively engaging the film, mechanism for rendering inoperable said means for preventing said feeding means from operatively engaging the film thereby permitting said feeding means operatively to engage the film and sequential control means operatively interconnecting said operating means and said mechanism, said control means including devices for operating said mechanism and said slack producing means in successive, predetermined time relation one to the other.

8. In a film handling apparatus, a continuously driven delivery member, a continuously driven take-up member, a gate structure disposed therebetween, said gate structure comprising complementary members defining therebetween a path for a film, means for intermittently feeding the film from said delivery member through said path toward said take-up member, said feeding means extending within said path between said gate members for feeding the film therealong, threading means for initially and selectively driving the first of said continuous members and said intermittent feeding means for producing unsupported loops of slack film between said continuous members and said intermittent feeding means respectively whereby an unsupported loop of slack is provided in the film to allow for the compensation necessary because of the difference in the character of movement of said continuous members and said intermittent feeding means during the operation of the same, operable means for preventing said feeding means from operatively engaging the film, mechanism for rendering inoperable said means for preventing said feeding means from operatively engaging the film, and sequential control means interconnecting said threading or slack producing means and said mechanism, said control means including devices for operating said mechanism and said slack producing means in successive relation one to the other.

9. In a film handling apparatus, two continuously moving film supports, means for intermittently feeding a film from one of said supports toward the other thereof, said means including a toothed member positioned between said supports and adapted to engage the film, means for separating the film and said toothed member whereby said toothed member and the film are maintained free of engagement, operable threading means for initially producing an unsupported loop of slack film between said intermittent toothed member and each of said continuous supports, means for rendering said slack producing means effective upon the film, means for actuating said continuous and intermittent feeding members whereby the regular feeding operation upon the film is begun, and control means operatively interconnecting said means for separating the film and said intermittent feeding member, said means for rendering said slack producing means effective upon the film, and said means for actuating said continuous and intermittent feeding members for operating all of the same.

10. In a film handling apparatus, two continuously moving film supports, means for intermittently feeding a film from one of said supports toward the other thereof, said means including a toothed member positioned between said supports and adapted to engage the film, means for separating the film and said toothed member whereby said toothed member and the film are maintained free of engagement, operable threading means for initially and selectively driving the first of said continuous supports and said toothed member for producing unsupported loops of slack film in that section of the film between said intermittent toothed member and each of said continuous supports, means for rendering said slack producing means effective upon the film, means for actuating said continuous supports and intermittent feeding member whereby the regular feeding operation upon the film is begun, and control means operatively interconnecting said means for separating the film and said intermittent feeding member, said means for rendering said slack producing means effective upon the film, and said means for actuating said continuous supports and intermittent feeding member for operating all of the same.

11. In a film handling apparatus, two continuously moving film supports, means for intermittently feeding a film from one of said supports toward the other thereof, said means including a toothed member positioned between said supports and adapted to engage the film, means for separating the film and said toothed member whereby said toothed member and the film are maintained free of engagement, operable threading means for initially producing an unsupported loop of slack film between said intermittent toothed member and each of said continuous supports, means for rendering said slack producing means effective upon the film, means for actuating said continuous and intermittent feeding members whereby the regular feeding operation upon the film is begun, and sequential control means operatively interconnecting said means for separating the film and said intermittent feeding member, said means for rendering said slack producing means effective upon the film, and said means for actuating said continuous and intermittent feeding members and including devices for successively operating each of the same in relation to the other thereof.

12. In a film handling apparatus, two continuously moving film supports, means for intermittently feeding a film from one of said supports toward the other thereof, said means including a toothed member positioned between said supports and adapted to engage the film, means for separating the film and said toothed member whereby said toothed member and the film are maintained free of engagement, operable threading means for initially and selectively driving the first of said continuous supports and said toothed member for producing unsupported loops of slack film in that section of the film between said intermittent toothed member and each of said continuous supports, means for rendering said slack producing means effective upon the film, means for actuating said continuous supports and intermittent feeding member whereby the regular feeding operation upon the film is begun, and sequential control means operatively interconnecting said means for separating the film and said intermittent feeding member, said means for rendering said slack producing means effective upon the film, and said means for actuating said continuous supports and intermittent feeding member and including devices for successively operating each of the same in relation to the other thereof.

13. In a film handling apparatus, a continuously driven delivery carrier, a continuously driven take-up carrier, a gate structure disposed therebetween, said gate structure comprising complementary members defining therebetween a path for a film, one of said complementary members being movable, means for intermittently feeding the film from said delivery carrier through said path toward said take-up carrier, said feeding means extending within said path and between said gate members for feeding the film therealong, threading means for initially producing an unsupported loop of slack in the length of film extending between said carriers whereby a sufficient amount of film is provided to allow for the compensation necessary because of the difference in character of movement of said carriers and said intermittent feeding means during the operation of the same, operable means for preventing said feeding means from operatively engaging the film, and control means operatively interconnecting said movable gate member, said slack producing means and said operable means for preventing the said feeding means from operatively engaging the film and effective for operating all of the same.

14. In a film handling apparatus, a continuously driven delivery carrier, a continuously driven take-up carrier, a gate structure disposed therebetween, said gate structure comprising complementary members defining therebetween a path for a film, one of said complementary members being movable, means for intermittently feeding the film from said delivery carrier through said path toward said take-up carrier, said feeding means extending within said path and between said gate members for feeding the film therealong, toothed threading means for initially producing slack in the length of film extending between said carriers whereby a sufficient amount of film is provided to allow for the compensation necessary because of the difference in character of movement of said carriers and said intermittent feeding means during the operation of the same, operable means for preventing said intermittent feeding means from operatively engaging the film, and control means operatively interconnecting said movable gate member, said slack producing means and said operable means for preventing the said feeding means from operatively engaging the film and effective for operating all of the same.

15. In a film handling apparatus, a continuously operable film supporting member from which a film may be unrolled while the film is being intermittently projected and upon which the film may thereafter be rewound, a continuously moving film supporting member upon which said film may be wound as it is being projected and from which it may thereafter be unrolled as it is being rewound, an openable gate through which the film passes disposed between said supporting members, a member engaging the film between said mechanism for feeding the film intermittently to project the same, means for rendering said intermittent member effective and ineffective upon the film, threading means for initially producing an unsupported loop of slack film between said intermittent feeding member and said supporting members whereby compensation may be secured for the difference in character of movement of said supporting members and said intermittent feeding member during the projecting cycle, and sequential control means interconnecting said gate, said slack producing means, both of said continuous supporting members, and said means for rendering said intermittent feeding member effective and ineffective upon the film, and necessarily effective to close said gate, to actuate said slack producing means and said second mentioned continuous supporting member, and to operate said means to render said intermittent feeding member effective to project the film, and thereafter to render inoperative said second mentioned supporting member and to operate said means to render said feeding member ineffective upon the film and to maintain said slack producing means inoperative and to open said gate and to actuate said first mentioned operable member to rewind the film.

16. In a film handling apparatus, a continuously operable film supporting member from which a film may be unrolled while the film is being intermittently projected and upon which the film may thereafter be rewound, a continuously moving member upon which said film may be wound as it is being projected and from which it may thereafter be unrolled as it is being rewound, an openable gate through which the film passes disposed between said continuous members, a member engaging the film between said supporting members for feeding the film intermittently to project the same, means for rendering said intermittent member effective and ineffective upon the film, toothed threading means for initially producing slack between said intermittent feeding member and said continuous members whereby compensation may be secured for the difference in character of movement of said continuous members and said intermittent feeding member during the projecting cycle, and sequential control means interconnecting said gate, said slack producing means, both of said continuous members, and said means for rendering said intermittent feeding member effective and ineffective upon the film, and necessarily effective to close said gate to actuate said slack producing means, said second mentioned continuous member, and to operate said means to render said intermittent feeding member effective to project the film, and thereafter to render inoperative said second mentioned continuous member and to operate said means to render said feeding member ineffective upon the film and to maintain said slack producing means inoperative and to open said gate and to actuate said first mentioned operable member to rewind the film.

17. In a film handling apparatus, means successively operable for moving a film intermittently in one direction for projection and continuously in the opposite direction for rewinding, means for initially producing an unsupported loop of slack film prior to said intermittent feeding operation, and control mechanism interlocking said film moving means and said slack producing means for rendering said slack producing means operative prior to the movement of the film in such projection direction and for maintaining said slack producing means inoperative immediately prior to the movement of the film in such rewinding direction.

18. In a film handling apparatus, means successively operable for moving a film intermittently in one direction for projection and continuously in the opposite direction for rewinding, toothed means for initially producing slack in the film prior to said intermittent feeding operation, and control mechanism interlocking said film moving means and said slack producing means for rendering said slack producing means operative prior to the movement of the film in such projection direction and for maintaining said slack producing means inoperative during the movement of the film in such rewinding direction.

19. In a film handling apparatus, two continuously moving toothed film supporting members, comprising a delivery member and a taking up member between which a film extends, toothed means engaging the film between said members for intermittently feeding the film from said delivery member toward said taking up member, a taking up spindle, means for continuously driving said taking up spindle whereby film fed theretoward by said toothed taking up member is coiled thereupon, threading means for initially producing slack between each of said continuous toothed film supporting members and said intermittent feeding means whereby compensation may be secured for the difference in character of movement of said continuous toothed members and said intermittent feeding means, and sequential control mechanism interlocking said means for continuously driving said taking up spindle and said slack producing means and including instrumentalities for initiating the operation of said means in predetermined successive relation.

20. In a film handling apparatus, continuously operating mechanism for supporting a film in said apparatus, mechanism for feeding the film intermittently, a member for pressing the film into operative engagement with said intermittent film feeding mechanism, means for operating said presser member, continuously operating mechanism for taking up the film, means for rendering said taking up mechanism effective to move the film, threading means for producing an unsupported loop of slack film in a portion of the film between said continuously supporting mechanism and said continuous taking up mechanism, means for driving said film feeding mechanism, and sequential control mechanism interconnecting all of said means and including devices for operating each of the same in predetermined sequential relation to the operation of all of the others thereof.

21. In a film handling apparatus, continuously operating mechanism for supporting a film in said apparatus, mechanism for feeding the film intermittently, a member for pressing the film into operative engagement with said intermittent film feeding mechanism, means for operating said presser member, continuously operating mechanism for taking up the film, means for rendering said taking up mechanism effective to move the film, threading means for selectively operating said continuous and intermittent mechanisms for producing unsupported loops of slack film in a portion of the film between said continuously supporting mechanism and said continuous taking up mechanism, means for driving said film feeding mechanism, and sequential control mechanism interconnecting all of said means and including devices for operating each of the same in predetermined sequential relation to the operation of all of the others thereof.

22. In a film handling apparatus, a continuously operating delivery member, a continuously operating take-up member, means for intermittently feeding the film from said delivery member toward said take-up member, said intermittent means including a member engaging the film between said delivery member and said take-up member, an operable presser member for pressing the film against said intermittent member, threading means for initially producing an unsupported loop of slack in the film between said delivery member and said take-up member whereby compensation for the difference in character of movement of said continuously operating members and said intermittent member may be secured, and sequential control mechanism interconnecting said slack producing means and said presser member and including instrumentalities for successively operating each of the same.

23. In a film handling apparatus, a continuously operating delivery member, a continuously operating take-up member, means for intermittently feeding the film from said delivery member toward said take-up member, said intermittent means including a member engaging the film between said delivery member and said take-up member, an operable presser member for pressing the film against said intermittent member, threading means for initially and selectively driving the first of said continuous members and said intermittent feeding means for producing unsupported loops of slack film in that section of the film between said delivery member and said take-up member whereby compensation for the difference in character of movement of said continuously operating members and said intermittent member may be secured, and sequential control mechanism interconnecting said slack producing means and said presser member and including instrumentalities for successively operating each of the same.

24. In a film handling apparatus, a continuously operating delivery member, a continuously operating take-up member, means for intermittently feeding the film from said delivery member toward said take-up member, said intermittent means including a member engaging the film between said delivery member and said take-up member, an operable presser member for pressing the film against said intermittent member, threading means for initially producing an unsupported loop of slack in the film between said delivery member and said take-up member whereby compensation for the difference in character of movement of said continuously operating members and said intermittent member may be secured, and sequential control mechanism interconnecting said slack producing means and said presser member and including instrumentalities for first operating said presser member and thereafter operating said slack producing means.

25. In a film handling apparatus, a continuously operating delivery member, a continuously operating take-up member, means for intermittently feeding the film from said delivery member toward said take-up member, said intermittent means including a member engaging the film between said delivery member and said take-up member, an operable presser member for pressing the film against said intermittent member, threading means for initially and selectively driving the first of said continuous members and said intermittent feeding means for producing unsupported loops of slack film in that section of the film between said delivery member and said take-up member whereby compensation for the difference in character of movement of said continuously operating members and said intermittent member may be secured, and sequential control mechanism interconnecting said slack producing means and said presser member and including instrumentalities for first operating said presser member and thereafter operating said slack producing means.

26. In a film handling apparatus, a continuously operating delivery member, a continuously operating take-up member, means for intermittently feeding the film from said delivery member toward said take-up member, said intermittent means including a member engaging the film between said delivery member and said take-up member, operable means for initially bringing the film into operative relation with said intermittent member, threading means for initially producing an unsupported loop of slack in the film between said delivery member and said take-up member whereby compensation for the difference in character of movement of said continuously operating members and said intermittent member may be secured, and sequential control mechanism interconnecting said slack producing means and said means for initially bringing the film into operative relation with said intermittent member and including instrumentalities for operating one of said means after the other thereof has been completely operated whereby the operation of one thereof does not interfere with the operation of the other thereof.

27. In a film handling apparatus, a continuously operating delivery member, a continuously operating take-up member, means for intermittently feeding the film from said delivery member toward said take-up member, said intermittent means including a member engaging the film between said delivery member and said take-up member, operable means for initially bringing the film into operative relation with said intermittent member, threading means for initially and selectively driving the first of said continuous members and said intermittent feeding means for producing unsupported loops of slack film in that section of the film between said delivery member and said take-up member whereby compensation for the difference in character of movement of said continuously operating members and said intermittent member may be secured, and sequential control mechanism interconnecting said slack producing means and said means for initially bringing the film into operative relation with said intermittent member and including instrumentalities for operating one of said means after the other thereof has been completely operated whereby the operation of one thereof does not interfere with the operation of the other thereof.

28. In a film handling apparatus, a delivery member and a take-up member between which a film extends, an operable intermittently moving film feeding mechanism disposed between said delivery member and said take-up member, an openable gate through which the film passes disposed between said members, operable means for moving the film into operative engagement with said feeding mechanism, operable threading means for initially producing an unsupported loop of slack film between said members to compensate for the difference in character of movement of said members and said intermittent feeding mechanism, and control means operatively interconnecting said means for moving the film into operative engagement with said feeding mechanism, said gate, said intermittently film moving mechanism, and said slack producing means, and effective to actuate said means to move the film into operative relation with said feeding mechanism and to close said gate and to initiate operation of said compensating means for producing slack in the film and to actuate said intermittent feeding mechanism.

29. In a film handling apparatus, a delivery member and a take-up member between which a film extends, an operable intermittently moving film feeding mechanism disposed between said delivery member and said take-up member, an openable gate through which the film passes disposed between said members, operable means for moving the film into operative engagement with said feeding mechanism, operable threading means for initially and selectively driving the first of said continuous members and said intermittent feeding means for producing unsupported loops of slack film between said members to compensate for the difference in character of movement of said members and said intermittent feeding mechanism, and control means operatively interconnecting said means for moving the film into operative engagement with said feeding mechanism, said gate, said intermittently film moving mechanism, and said slack producing means, and effective to actuate said means to move the film into operative relation with said feeding mechanism and to close said gate and to initiate operation of said compensating means for producing slack in the film and to actuate said intermittent feeding mechanism.

30. In a film handling apparatus, a delivery member and a take-up member between which a film extends, an operable intermittently moving feeding mechanism disposed between said delivery member and said take-up member, operable means for initially moving the film into operative engagement with said intermittent feeding mechanism, operable threading means for initially producing at least one unsupported loop of slack film between said members to compensate for the difference in character of movement of said members and said intermittent feeding mechanism, and control means operatively interconnecting said means for moving the film into operative engagement with said feeding mechanism, said intermittent film moving mechanism, and said slack producing means, and effective to actuate said means to bring the film into operative relation with said feeding mechanism and to initiate operation of said slack producing means and said feeding mechanism.

31. In a film handling apparatus, two continuously moving film supporting members between which a film extends, an operable intermittently moving feeding means disposed between said members, an openable gate disposed between said members through which said film passes, operable threading means for initially producing at least one unsupported loop of slack in the film between said members for compensating for the difference in character of movement of said continuous members and said intermittent feeding means, means for regularly driving said continuous members and said intermittent feeding means for carrying out the regular feeding operation, and control means interconnecting said driving and said slack producing means and said gate and effective to close said gate and to actuate said slack producing means and to operate said driving means.

32. In a film handling apparatus, a film supporting member, a member for feeding the film intermittently, means for driving said intermittent film feeding member, means for initially moving the film into operative relation with said film feeding member, a continuously operating member for taking up the film, means for producing at least one unsupported loop of slack in a portion of the film between said supporting and said taking up members and sequential control means interconnecting all of said previously mentioned means and including instrumentalities for actuating said previously mentioned means in the following succession: first, said means to move the film into relation with said intermittent film feeding member and said means for rendering said taking up member effective to move the film; second, said means to produce slack in the film; and, third, said means to drive said intermittent feeding member.

33. In a film handling apparatus, a continuously operable film supporting member, an openable gate through which the film passes, means for closing said gate, a member for moving the film to feed the same, means for initially moving the film into operative relation with said film feeding member, a continuously operating member for taking up the film, means for rendering said take-up mechanism effective to move the film, mechanism for producing at least one unsupported loop of slack in a portion of the film between said continuous supporting member and said continuous taking up member, means for operating said slack producing mechanism, means for driving said intermittent film feeding member, and control mechanism operatively interconnecting all of said previously mentioned means and including instrumentalities for operating all of said means.

34. In a film handling apparatus, a continuously operating film supporting member, an openable gate through which the film passes, means for closing said gate, a member for intermittently moving the film to feed the same, threading means for initially moving the film into operative relation with said intermittent feeding member, a continuously operating member for taking up the film, means for rendering said taking up member effective to move the film, means for producing an unsupported loop of slack in a portion of the film between said supporting member and said take-up member, means for driving said intermittent film moving member, and control means, said control means including a movable actuating member and mechanism operatively interconnecting said movable actuating member and all of said previously mentioned means for operating all of the same upon the movement of said actuating member.

35. In a film handling apparatus, a continuously operating film supporting member, a member for intermittently moving the film to feed the same, threading means for initially moving the film into operative relation with said intermittent feeding member, a continuously operating member for taking up the film, mechanism for producing at least one unsupported loop of slack in a portion of the film between said supporting member and said taking up member, means for operating said slack producing mechanism, means for rendering said taking up member effective to move the film, and control means interconnecting said previously mentioned means and including devices for operating said previously mentioned means in the following succession: first, said means to move the film into relation with said intermittent film feeding member; second, said means to render said taking up member effective to move the film; and, third, said means for operating said slack producing mechanism.

36. In a film handling apparatus, a continuously operating film supporting member, a member for intermittently moving the film to feed the same, threading means for initially moving the film into operative relation with said intermittent feeding member, a continuously operating member for taking up the film, toothed film moving mechanism for producing slack in a portion of the film between said supporting member and said taking up member, means for operating said slack producing mechanism, means for rendering said taking up member effective to move the film, and control means interconnecting said previously mentioned means and including devices for operating said previously mentioned means in the following succession: first, said means to move the film into relation with said intermittent film feeding member; second, said means to render said taking up member effective to move the film; and, third, said means for operating said slack producing mechanism.

37. In a film handling apparatus, a continuously operating member for supporting a film in said apparatus, an openable gate through which the film passes, means for closing said gate, a continuously operating member for moving the film to feed the same, a continuously operating member for taking up the film, means for producing at least one unsupported loop of slack in a portion of the film between said continuous supporting member and said continuous taking up member, means for rendering said taking up member effective to move the film, and control means operatively interconnecting said previously mentioned means and effective to operate the same in the following succession: first, said gate closing means; second, said means to render said taking up member effective to move the film; third, said slack producing means.

38. In a film handling apparatus, a continuously operating member for supporting a film in said apparatus, an openable gate through which the film passes, means for closing said gate, a continuously operating member for moving the film to feed the same, a continuously operating member for taking up the film, toothed means for producing slack in a portion of the film between said continuous supporting member and said continuous taking up member, means for rendering said taking up member effective to move the film, and control means operatively interconnecting said previously mentioned means and effective to operate the same in the following succession: first, said gate closing means; second, said means to render said taking up member effective to move the film; third, said slack producing means.

39. In a film handling apparatus, a member for taking up the film, means for rendering said taking up member effective to move the film, operable means for producing a loop of unsupported slack in the film adjacent said taking up member, and sequential control means, said control means including a movable actuating member and mechanism operatively interconnecting said actuating member and said driving means and said slack producing means for actuating said means for rendering said taking up member effective upon the film upon a first portion of the movement of said actuating member and for actuating said slack producing means upon a succeeding portion of the movement of said actuating member.

40. In a film handling apparatus, a member for taking up the film, means for rendering said taking up member effective to move the film, operable toothed means for producing slack in the film adjacent said taking up member, and sequential control means, said control means including a movable actuating member and mechanism operatively interconnecting said actuating member and said driving means and said slack producing means for actuating said means for rendering said taking up member effective upon the film upon a first portion of the movement of said actuating member and for actuating said slack producing means upon a succeeding portion of the movement of said actuating member.

41. In a film handling apparatus, a continuously operating film supporting member, an openable gate through which the film passes, means for closing said gate, a member for intermittently moving the film to feed the same, threading means for initially moving the film into operative relation with said intermittent film moving member, a continuously operating member for taking up the film, operable mechanism for producing an unsupported loop of slack film in a portion of the film between said supporting member and said taking up member, means to actuate said slack producing means, means for concurrently driving said feeding and said taking up members, and control means operatively interconnecting said previously mentioned means and including instrumentalities which operate said means in the following succession: first, said means to move the film into relation with said intermittent film feeding member and said means to actuate said slack producing means and to actuate said gate closing means; and, thereafter, said means to drive said taking up member and said feeding member.

42. In a film handling apparatus, a continuously operating film supporting member, an openable gate through which the film passes, means for closing said gate, a member for intermittently moving the film to feed the same, threading means for initially moving the film into operative relation with said intermittent film moving member, a continuously operating member for taking up the film, operable toothed film moving mechanism for producing slack in a portion of the film between said supporting member and said taking up member, means to actuate said slack producing means, means for concurrently driving said feeding and said taking up members, and control means operatively interconnecting said previously mentioned means and including instrumentalities which operate said means in the following succession: first, said means to move the film into relation with said intermittent film feeding member and said means to actuate said slack producing means and to actuate said gate closing means; and, thereafter, said means to drive said taking up member and said feeding member.

43. In a film handling apparatus, a continuously operating film feeding member, an openable gate through which the film passes, means for closing said gate, a member for moving the film intermittently to feed the same, a continuously operating member for taking up the film, mechanism for producing an unsupported loop of slack film in a portion of the film between said continuous supporting member and said continuous taking up member, means for actuating said slack producing mechanism, means for regularly driving said continuous and intermittent member for carrying out the regular feeding operation upon the film, and sequential control means interconnecting said previously mentioned means and including instrumentalities for operating the same in the following succession: first, said means for closing said gate; second, said means for actuating said slack producing mechanism; and, third, said driving means.

44. In a film handling apparatus, a continuously operating film feeding member, an openable gate through which the film passes, means for closing said gate, a member for moving the film intermittently to feed the same, a continuously operating member for taking up the film, toothed film moving mechanism for producing slack in a portion of the film between said continuous supporting member and said continuous taking up member, means for actuating said slack producing means, means for regularly driving said continuous and intermittent members for carrying out the regular feeding operation upon the film, and sequential control means interconnecting said previously mentioned means and including instrumentalities for operating the same in the following succession: first, said means for closing said gate; second, said means for actuating said slack producing mechanism; and, third, said driving means.

45. In a film handling apparatus, a continuously operating film supporting member, an openable gate through which the film passes, means for closing said gate, a member for intermittently moving the film to feed the same, a continuously operating member for taking up the film, mechanism for producing at least one unsupported loop of slack in a portion of the film between said supporting member and said taking up member, means to actuate said slack producing mechanism, and sequential control mechanism operatively interconnecting both of said means and including instrumentalities for operating each of the same in successive relation to the operation of the other thereof.

46. In a film handling apparatus, a continuously operating film supporting member, an openable gate through which the film passes, means for closing said gate, a member for intermittently moving the film to feed the same, a continuously operating member for taking up the film, toothed film moving mechanism for producing slack in a portion of the film between said supporting member and said taking up member, means to actuate said slack producing mechanism, and sequential control mechanism operatively interconnecting both of said means and including instrumentalities for operating each of the same in successive relation to the operation of the other thereof.

47. In a film handling apparatus, a continuously operating film supporting member, a member for intermittently moving the film to feed the same, threading means for initially moving the film into operative relation with said intermittent film moving member, a continuously operating member for taking up the film, operable mechanism for producing an unsupported loop of slack film in a portion of the film between said continuously operating supporting member and said continuously operating taking up member, means for actuating said slack producing mechanism, means for regularly driving said continuous and intermittent members for carrying out the regular feeding operation upon the film, and means operatively interconnecting said previously mentioned means and including instrumentalities which operate said means in the following succession: first, said means to move the film into relation with said intermittent film moving member; second, said means to actuate said slack producing mechanism; and, third, said means for driving said feeding members.

48. In a film handling apparatus, a continuously operating film supporting member, a member for intermittently moving the film to feed the same, threading means for initially moving the film into operative relation with said intermittent film moving member, a continuously operating member for taking up the film, operable toothed film moving mechanism for producing slack in a portion of the film between said continuously operating supporting member and said continuously operating taking up member, means for actuating said slack producing mechanism, means for regularly driving said continuous and intermittent members for carrying out the regular feeding operation upon the film, and means operatively interconnecting said previously mentioned means and including instrumentalities which operate said means in the following succession: first, said means to move the film into relation with said intermittent film moving member; second, said means to actuate said slack producing mechanism; and, third, said means for driving said feeding members.

49. In a film handling apparatus, an openable film receiving gate, means for intermittently feeding a film through said gate, a film engaging member, means for operating said film engaging member for producing slack in the film for cooperation with said feeding means, and means operatively interconnected with said gate and said means for operating said film engaging member for opening said gate while maintaining said operating means inoperative.

50. In a film handling apparatus, an openable film receiving gate, intermittent means for feeding a film therethrough, means for producing slack in the film prior to the operation of said feeding means for cooperation with said feeding means, and sequential control mechanism interconnecting said gate and said slack producing means and including instrumentalities for maintaining said slack producing means inoperative until after said gate has been closed.

51. In a film handling apparatus, an openable film receiving gate, means for feeding a film therethrough, means for producing slack in the film for cooperation with said feeding means, and sequential control mechanism interconnecting said slack producing means and said gate, said control mechanism including instrumentalities alternatively effective for closing said gate and actuating said slack producing means and for opening said gate and maintaining said slack producing means locked against movement.

52. In a film handling apparatus, film feeding means, threading means movable from and to a guiding position wherein they are effective for directing a film relatively to said feeding means during the preliminary positioning of the film in the apparatus, means other than said threading means and effective on opposite sides of said feeding means for producing the desired slack in the film for cooperation with said feeding means, and sequential control means operatively interconnecting said guiding means and said slack producing means, said control means including instrumentalities for first moving said threading means away from said guiding position and for thereafter actuating said slack producing means.

53. In a film handling apparatus, film feeding means, threading means movable from and to a guiding position wherein they are effective for directing a film relatively to said feeding means during the preliminary positioning of the film in the apparatus, means other than said threading means effective on opposite sides of said feeding means for producing the desired slack in the film for cooperation with said feeding means, and sequential control means operatively interconnecting said guiding means and said slack producing means, said control means including instrumentalities for first moving said threading means into said guiding position and thereafter for actuating said slack producing means.

54. In a film handling apparatus, a continuously moving delivery support, a continuously moving take-up support, a member for intermittently feeding a film from said delivery support toward said take-up support, means for initially producing an unsupported loop of slack in the length of film extending between said supports for providing a sufficient amount of film between said supports to allow for the difference in character of movement of said supports and said intermittent feeding means during the operation of the same, and operable threading means including means for initially positioning the film by moving it into the area of operation of said slack producing means and means separate from those which control the regular intermittent feeding operation for actuating said slack producing means.

55. In a film handling apparatus, two continuously moving film supports, means for intermittently feeding the film from one of said supports toward the other, said means including a member positioned between said supports and engaging the film, means cooperating with said two film supports and said intermittent member for defining a path between said supports, operable means for producing unsupported loops of slack in those sections of the film between said intermittent member and said film supports respectively, said slack producing means including a film engaging member disposed within said path, means for operating said slack producing means, means for bodily moving the film from a position outside of said path into said path, and control mechanism operatively interconnecting said means for operating said slack producing means and said means for moving the film into said path and effective for operating both of the same.

56. In a film handling apparatus, a continuously moving delivery support, a continuously moving take-up support, means for intermittently feeding a film from said delivery support toward said take-up support, said means including a member positioned between said supports and adapted to engage the film, threading means for initially producing slack in the length of film extending between said supports, positioning means for initially moving the film into operative relation with said slack producing means, and sequential control means operatively interconnecting said slack producing means and said positioning means and effective for first operating said positioning means and thereafter for operating said slack producing means whereby the film is automatically first placed in such relation with said slack producing means that said slack producing means may be operative thereupon and thereafter said slack producing means is operated to provide the necessary loops of slack film.

57. In a film handling apparatus, a continuously operating delivery member, a continuously operating taking up member, an intermittently moving film feeding means engaging the film between said members for feeding the film from said delivery member toward said taking up member, mechanism for rendering said intermittent feeding means operative upon the film, means for producing unsupported loops of slack in those sections of the film between said intermittent feeding means and each of said continuous members respectively, said means including a film engaging member, mechanism for rendering said film engaging member operative upon the film to produce said loops, mechanism for moving the film into the area of operation of said film engaging member, and control means, said control means including a movable actuating member and instrumentalities connecting said actuating member with all of said mechanisms for operating said mechanism for moving the film into the area of operation of said film engaging member upon the first portion of the movement of said actuating member and for operating said means for rendering said film engaging member operable upon the film for producing slack during the succeeding portion of such movement of said actuating member, and for operating said mechanism for actuating said feeding means upon the next succeeding portion of said movement.

58. In a film handling apparatus, means for feeding a film continuously, means for feeding the film intermittently, means for producing an unsupported loop of slack between said intermittent feeding means and said continuous means, said slack producing means including a film engaging member, and threading means for positioning the film relatively to said film engaging member, said film positioning means including means for moving the film in one direction for the purpose of bringing it into a predetermined position relatively to said member and means for moving the film in a direction approximately at right angles to said previously mentioned direction for the purpose of moving the film from such position and into operative relation to said film engaging member.

59. In a film handling apparatus, a member for feeding a film continuously, a member for feeding the film intermittently, means for producing slack in the portion of the film between said continuous member and said intermittent member, said slack producing means including a film engaging member, a first threading means for moving the film in one direction for the purpose of positioning it in operative relation to said film engaging member, a second threading member for moving the film in a direction angular to such first mentioned direction for the purpose of moving it into a predetermined position in the space intervening between the first threading member and said film engaging member from a position outside of such space, and sequential control mechanism operatively interconnecting both of said positioning means for successively actuating each of the same.

60. In a film handling apparatus, a continuous feeding member, an intermittent feeding member, and threading means for initially positioning the film in the proper operative relation to said intermittent feeding member so that the regular feeding operation may be carried out thereupon, said threading means including means for producing an unsupported loop of slack in that portion of the film between said continuous and said intermittent feeding members and means mounted upon said apparatus and embodying means whereby it may be operated for initially moving the film in a direction angular to the axis of said intermittent feeding member and into correct lateral relation opposite to said intermittent feeding member.

61. In a film handling apparatus, a continuous feeding member, an intermittent feeding member, and threading means for initially positioning the film in the proper operative relation to said intermittent feeding member so that the regular feeding operation may be carried out thereupon, said threading means including means for producing an unsupported loop of slack in that portion of the film between said continuous and said intermittent feeding members, means mounted upon said apparatus and embodying means whereby it may be operated for initially positioning the film in correct lateral relation to said intermittent feeding member, and said threading means further including sequential control means operatively interconnecting said slack producing means and said lateral positioning means for successively operating each of said means.

62. In a film handling apparatus which includes an apertured guide and means for feeding a film past the aperture thereof, a continuous feeding member, an intermittent feeding member, threading means mounted upon said apparatus and embodying means whereby it may be operated for initially positioning the film by lateral movement thereof in correct lateral relation to the aperture of said guide, and threading means for producing an unsupported loop of slack in the film between said continuous and intermittent feeding members.

63. In a film handling apparatus which includes an apertured guide and means for feeding a film past the aperture thereof, a continuous feeding member, an intermittent feeding member, operable threading means for initially positioning the film by lateral movement thereof in correct lateral relation to the aperture of said guide, threading means for producing an unsupported loop of slack in the film between said continuous and intermittent feeding members, and sequential control means operatively interconnecting both of said threading means for successively operating each of said means.

64. In a film handling apparatus, a continuously moving film feeding member and an intermittently moving feeding member, means for producing an unsupported loop of slack in the portion of the film between said continuous and intermittent feeding members, said slack producing means including a film engaging member, an operable positioning member mounted upon said apparatus for movement relatively to said film engaging member for engaging an edge of the film and moving it laterally into a position opposite said film engaging member, and means for moving said positioning member.

65. In a film handling apparatus, a continuously moving film feeding member and an intermittently moving feeding member, operable means for producing an unsupported loop of slack in that portion of the film between said continuous and intermittent feeding members, said slack producing means including a film engaging member, and an operable positioning member mounted upon said apparatus for movement relative to said film engaging member for engaging an edge of the film and moving it laterally into a position opposite said film engaging member, and control means operatively interconnecting said slack producing means and said positioning member for moving said positioning member and operating said slack producing means.

66. In a film handling apparatus, a continuously moving film feeding member and an intermittently moving feeding member, means for producing slack in that portion of the film between said continuous and said intermittent feeding members, said slack producing means including a film engaging member, and an operable positioning member mounted upon said apparatus for movement relative to said film engaging member for engaging an edge of the film and moving it laterally into a position opposite said film engaging member, and sequential control means operatively interconnecting said slack producing means and said positioning member and including devices for first moving said positioning member and thereafter operating said slack producing means.

67. In a film handling apparatus, two toothed feeding members adapted to engage the film, mechanism for guiding the film between said feeding members, said guiding mechanism comprising a relatively fixed guide-way for establishing one side of a path between said feeding members and a guiding member movable from and to a position wherein it establishes the other side of said path, means for moving said guiding member, means for rendering one of said feeding members effective to advance the film, means for rendering the other of said feeding members effective to advance the film, and sequential control mechanism interconnecting all of said means and including devices for actuating each of the same in successive relation to the actuation of the others thereof.

68. In a film handling apparatus, two toothed film feeding members for successively advancing the same film, means for guiding the film between said members, said guiding means comprising a relatively fixed guide-way for establishing one side of the path between said feeding members, and a guiding member movable from and to a position wherein it establishes the other side of said path, a source of power, means for moving said guiding member, means for connecting one of said feeding members with said source of power, means for connecting the other of said feeding members with said source of power, and control mechanism interconnecting said connecting means and said means for moving said guiding member for operating all of the same.

69. In a film handling apparatus, two toothed film feeding members for successively advancing the same film, guiding means for establishing a path between said feeding members wherein the film may be threaded, said guiding means including a guiding member movable between a first position wherein it defines one side of said path and a second position wherein it is completely removed from guiding relation with the film, means for moving said guiding member from said first to said second position, means for rendering one of said feeding members effective upon the film to advance the same, and sequential control mechanism interconnecting both of said means and including instrumentalities for first operating said moving means for moving said guiding member from said first to said second position and thereafter operating said means for rendering said feeding member effective upon the film.

70. In a film handling apparatus, two film feeding members for successively advancing the same film, means for producing a loop of slack in that section of the film between said feeding members, guiding means for establishing a path between said feeding members wherein the film may be threaded, said guiding means including a guiding member movable between a first position wherein it defines one side of said path and a second position wherein it is removed from guiding relation and contact with the film, means for moving said guiding member from said first to said second position, means for rendering one of said feeding members effective upon the film to advance the same, and sequential control mechanism interconnecting both of said means and including instrumentalities for first operating said moving means for moving said guiding member between said second position and said first position whereby a threading guideway is created in which the film may be initially positioned, second, operating said moving means for moving said guiding means from said first position to said second position whereby such threading pathway is destroyed and space for said loop of slack film is created, and, third, for operating said means for rendering said feeding member effective to advance the film whereby the regular feeding operation is carried out.

71. In a film handling apparatus, two spaced toothed feeding members for successively advancing the same film, a guiding member movable from and to a position between said feeding members for establishing one side of the path therebetween, means for moving said guiding member between said positions, operable means for separating the teeth of one of said members and the film, a source of power, means for connecting said feeding members with said source of power, and control mechanism interlocking said connecting means, said moving means, and said separating means and effective for operating all of the same.

72. In a film handling apparatus, two spaced toothed feeding members for successively advancing the same film, a guiding member movable from and to a position between said feeding members for establishing one side of the path therebetween, means for moving said guiding member between said positions, operable means for separating the teeth of one of said members and the film, a source of power, means for connecting said feeding members with said source of power, and sequential control mechanism interlocking said connecting means, said moving means, and said separating means, and including instrumentalities effective for successively operating each of the same.

73. In a film handling apparatus, two spaced toothed feeding members for successively advancing the same film, a guiding member movable from and to a position between said feeding members for establishing one side of the path therebetween, means for moving said guiding member between said positions, operable means for separating the teeth of one of said members and the film, a source of power, means for connecting a first of said feeding members with said source of power, means for connecting the second of said feeding members with said source of power, and sequential control mechanism interlocking each of said connecting means, said moving means, and said separating means and including instrumentalities effective for successively operating each of the same.

74. In a film handling apparatus, two spaced toothed feeding members for successively advancing the same film, a guiding member movable from and to a position between said feeding members for establishing one side of the path therebetween in which the film is initially positioned, means for forming a loop of slack in the film between said feeding members, means for moving said guiding member from said path-defining position so that space may be provided for the loop, a source of power, means for connecting one of said feeding members with said source of power for regularly advancing the film, and control mechanism interlocking said connecting means, said moving means, and said loop forming means and effective for operating all of the same.

75. In a film handling apparatus, two spaced toothed feeding members for successively advancing the same film, a guiding member movable from and to a position between said feeding members for establishing one side of the path therebetween in which the film is initially positioned, means for forming a loop of slack in the film between said feeding members, means for moving said guiding member from said path-defining position so that space may be provided for the loop, means for rendering one of said feeding members effective upon the film for regularly advancing the same, and sequential control mechanism interconnecting said means for rendering said feeding member effective for regularly advancing the film, said moving means, and said loop forming means and including instrumentalities which are effective for successively operating each of said means.

76. In a film handling apparatus, a feeding member, means for initially producing a loop of slack film adjacent said feeding member for cooperation therewith, a threading guide separate from said loop producing means and movable between a threading position adjacent said feeding member wherein it initially directs the film in relation to said feeding member and a running position relatively remote from said feeding member wherein it is without contact with the film and does not interfere with the loop thereof, means for moving said threading guide from and to such guiding position, and control mechanism interlocking said loop producing means and said means for moving said guide and effective to operate both of the same.

77. In a film handling apparatus, a feeding member, means for initially producing a loop of slack film adjacent said feeding member for cooperation therewith, a threading guide separate from said loop producing means and movable between a threading position adjacent said feeding member wherein it initially directs the film in relation to said feeding member and a running position relatively remote from said feeding member wherein it is without contact with the film and does not interfere with the loop thereof, means for moving said threading guide between said positions, and sequential control mechanism interlocking said loop producing means and said means for moving said guide and including instrumentalities which are effective successively to operate each of the same.

78. In a film handling apparatus, a toothed feeding member, a presser member for said feeding member, said presser member being movable between a first position wherein it is operative to press the film against the teeth of said feeding member and a second position wherein it is disposed at a short distance from said feeding member and so disposed as to form one side of a path in which the film is initially threaded, a shield movable to a position, when said presser member is disposed in said second position, between said presser member and said feeding member for protecting the film from the teeth of said feeding member and wherein it forms one side of a portion of said threading path, a guiding member disposed adjacent said feeding member and movable from and to a threading position wherein it is disposed adjacent said shield when said shield is in such protective position for the purpose of cooperating with said shield and with said presser member for creating a further section of said path in which the film may be initially threaded, an openable gate disposed adjacent said guiding member, said gate including a section movable to a position wherein it is disposed in cooperative relation to one end of said guiding member, and a fixed section which is disposed adjacent the position assumed by one end of said shielding member when said shielding member is disposed in protective position, whereby the threading path is further elongated.

79. In a film handling apparatus, a toothed feeding member, a presser member for said feeding member, said presser member being movable between a first position wherein it is operative to press the film against the teeth of said feeding member and a second position wherein it is disposed at a short distance from said feeding member and so disposed as to form one side of a path in which the film is initially threaded, a shield movable to a position, when said presser member is disposed in said second position, between said presser member and said feeding member for protecting the film from the teeth of said feeding member and wherein it forms one side of a portion of said threading path, a guiding member disposed adjacent said feeding member and movable from and to a threading position wherein it is disposed adjacent said shield when said shield is in such protective position for the purpose of cooperating with said shield and with said presser member for creating a further section of said path in which the film may be initially threaded, an openable gate disposed adjacent said guiding member, said gate including a section movable to a position wherein it is disposed in cooperative relation to one end of said guiding member, and a fixed section which is disposed adjacent the position assumed by one end of said shielding member when said shielding member is disposed in protective position, whereby the threading path is further elongated, and control mechanism interconnecting said presser member, said shield, and said movable gate section, and effective for operating all of the same.

80. In a film handling apparatus, a toothed feeding member, a presser member for said feeding member, said presser member being movable between a first position wherein it is operative to press the film against the teeth of said feeding member and a second position wherein it is disposed at a short distance from said feeding member and so disposed as to form one side of a path in which the film is initially threaded, a shield movable, when said shield is disposed in said second position, to a position between said presser member and said feeding member for protecting the film from the teeth of said feeding member and wherein it forms one side of a portion of said threading path, a guiding member disposed adjacent said feeding member and movable from and to a threading position wherein it is disposed adjacent said shield when said shield is in such protective position for the purpose of cooperating with said shield and with said presser member for creating a further section of said path in which the film may be initially threaded, an openable gate disposed adjacent said guiding member, said gate including a section movable to a position wherein it is disposed in cooperative relation to one end of said guiding member and a fixed section which is disposed adjacent the position assumed by one end of said shielding member wherein said shielding member is disposed in protective position whereby the threading path is further elongated, a source of power, means for connecting said feeding member with said source of power, and control mechanism interconnecting said presser member, said shield, said movable gate section, and said connecting means and effective for operating all of the same.

81. In a film handling apparatus, a feeding sprocket, a curved shield movable to a position substantially embracing said sprocket for protecting a film from the teeth thereof and for creating one side of a path in which the film is initially threaded, a presser member movable to a first position wherein it presses a film against a portion of the periphery of said sprocket when said shield is disposed in inoperative and non-shielding position and to a second position wherein it creates a portion of the side of said threading path opposite that which is created by said shield when said shield is disposed in said shielding position, a guiding member curved substantially to correspond to the curvature of said sprocket and movable from and to a position wherein it cooperates with said presser member to form a remaining portion of the side of said threading path opposite that which is formed by said curved shield, and control means operatively interconnecting said shield, said presser member, and said guide for operating all of the same.

82. In a film handling apparatus, a feeding sprocket, a curved shield movable to a position substantially embracing said sprocket for protecting a film from the teeth thereof and for creating one side of a path in which the film is initially threaded, a presser member movable to a first position wherein it presses a film against a portion of the periphery of said sprocket when said shield is disposed in inoperative and non-shielding position and to a second position wherein it creates a portion of the side of said threading path opposite that which is created by said shield when said shield is disposed in said shielding position, and a guiding member curved substantially to correspond to the curvature of said sprocket and movable from and to a position wherein it cooperates with said presser member to form a remaining portion of the side of said threading path opposite that which is formed by said curved shield.

83. In a film handling apparatus, in combination, a delivery carrier, a take-up carrier, means for feeding a film between said carriers, means for forming a loop of slack in the film for cooperation with said feeding means, and control mechanism for operating said slack forming means, said control mechanism including a lever system, spring means connected to said loop forming means through said lever system for operating said loop forming means, and a movable actuating member for applying the power of said spring means to said lever system upon an initial movement of said actuating member.

84. In a film handling apparatus, a delivery carrier, a take-up carrier, means for feeding a film between said carriers, means for forming a loop of slack in the film for cooperation with said feeding means, and control mechanism for operating said slack forming means, said control mechanism including a lever system, spring means connected to said control mechanism through said lever system for operating said mechanism, and a manually movable actuating member for applying the power of said spring means to said lever system after an initial manual movement of said actuating member, and means locking said control mechanism against manual interference after said initial manual movement whereby said spring means completes the operation of said control mechanism to operate said slack creating means while said control mechanism is locked against manual interference.

85. In a film handling apparatus, film feeding means, a primary source of power, and control mechanism for operatively connecting said feeding means and said source of power, said control mechanism including a lever system and a plurality of operable control members, an actuating member successively movable into operative connection with each of said control members, means for successively moving said actuating member into operative connection with each of said control members, a connection between each of said control members and said primary source of power effective during the period during which said control member is in operative connection with said actuating member for governing the transmission of power from said primary source to said feeding means, a spring for driving said actuating member predeterminedly so that it successively engages each of said control members, said spring being connected thereto through said lever system, a latch for holding said spring under compression, and a member manually movable both for placing said spring under compression and for subsequent operation for releasing said latch so that said spring drives said actuating member.

WARREN DUNHAM FOSTER.